United States Patent
Ashida et al.

(10) Patent No.: US 9,581,427 B2
(45) Date of Patent: Feb. 28, 2017

(54) MECHANICAL QUANTITY MEASURING DEVICE

(75) Inventors: Kisho Ashida, Tokyo (JP); Hiroyuki Ohta, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 179 days.

(21) Appl. No.: 14/363,138

(22) PCT Filed: Dec. 6, 2011

(86) PCT No.: PCT/JP2011/078183
§ 371 (c)(1),
(2), (4) Date: Jun. 5, 2014

(87) PCT Pub. No.: WO2013/084294
PCT Pub. Date: Jun. 13, 2013

(65) Prior Publication Data
US 2015/0027231 A1    Jan. 29, 2015

(51) Int. Cl.
*G01L 1/18* (2006.01)
*G01B 7/16* (2006.01)

(52) U.S. Cl.
CPC .............. *G01B 7/16* (2013.01); *G01B 7/18* (2013.01); *G01L 1/18* (2013.01)

(58) Field of Classification Search
CPC .... G01L 1/22; G01L 1/04; G01L 1/18; G01B 7/16
USPC .......................................................... 73/777
See application file for complete search history.

(56) References Cited

U.S. PATENT DOCUMENTS

| 5,625,151 | A  | * | 4/1997  | Yamaguchi     | G01L 19/04 73/716 |
| 7,370,536 | B2 |   | 5/2008  | Ueyanagi et al. |                 |
| 7,615,835 | B2 | * | 11/2009 | Takemasa      | G01P 1/006 257/417 |
| 8,438,931 | B2 |   | 5/2013  | Kazama et al. |                 |
| 8,833,173 | B2 | * | 9/2014  | Mol           | G01B 7/20 73/760 |
| 9,190,537 | B2 | * | 11/2015 | Ashida        | G01B 7/16       |
| 2007/0240519 | A1 | | 10/2007 | Shimizu et al. |                |

FOREIGN PATENT DOCUMENTS

EP   2 184 576 A1   5/2010
JP   55-7323 U      1/1980
(Continued)

OTHER PUBLICATIONS

International Search Report dated Feb. 7, 2012 (Two (2) pages).
(Continued)

*Primary Examiner* — Lisa Caputo
*Assistant Examiner* — Octavia Hollington
(74) *Attorney, Agent, or Firm* — Crowell & Moring LLP

(57) ABSTRACT

A mechanical quantity measuring device (semiconductor strain sensor) has a semiconductor chip including a plurality of piezoresistive elements formed on a front surface of a semiconductor substrate, a lead wire unit electrically connected to a plurality of electrodes of the semiconductor chip, and a plate member joined to a rear surface of the semiconductor chip. Further, the plate member includes a first region facing the rear surface of the semiconductor chip and a second region provided adjacent to the first region, and a thickness of the plate member in the first region is made larger than a thickness in the second region.

17 Claims, 14 Drawing Sheets

(56) References Cited

FOREIGN PATENT DOCUMENTS

| | | |
|---|---|---|
| JP | 9-264800 A | 10/1997 |
| JP | 2001-272287 A | 10/2001 |
| JP | 2006-266818 A | 10/2006 |
| JP | 2009-229183 A | 10/2009 |
| WO | WO 2009/028283 A1 | 3/2009 |
| WO | WO 2011/006523 A1 | 1/2011 |

OTHER PUBLICATIONS

Extended European Search Report issued in counterpart European Application No. 11877135.1 dated Jul. 22, 2015 (Seven (7) pages).

* cited by examiner

MECHANICAL QUANTITY MEASURING DEVICE

TECHNICAL FIELD

This invention relates to a mechanical quantity measuring device, and specifically to a technology effective for application to a mechanical quantity measuring device using a semiconductor strain sensor that may measure strain and stress of a structure.

BACKGROUND ART

JP-A-2001-272287 (PTL 1) has disclosed a strain detection sensor in which a sensor chip (strain detection element) is joined to a glass base using low-melting-point glass.

Further, JP-A-2006-266818 (PTL 2) has disclosed, as a pressure sensor device that measures pressure of a fluid such as oil, a pressure sensor device having a structure in which a pressure sensor chip is mounted on a convex part of a metal member with through holes formed therein via a glass base.

CITATION LIST

Patent Literatures

PTL 1: JP-A-2001-272287

SUMMARY OF INVENTION

Technical Problem

The most common method of measuring strain and stress of a structure is a method using a strain gauge. The strain gauge has a structure in which a wiring pattern of a metal thin film of a Cu—Ni alloy or Ni—Cr alloy is formed on a polyimide or epoxy resin film and a lead wire is provided, and is bonded to an object to be measured with an adhesive for use. The gauge may calculate a strain quantity from changes in resistance value due to deformation of the metal thin film.

On the other hand, as a method of performing strain measurement with the higher accuracy, a semiconductor strain sensor using semiconductor is being developed. The sensor is a device having a strain sensing unit using not a metal thin film, but a semiconductor piezoresistance formed by doping an impurity in a semiconductor such as silicon (Si). The semiconductor strain sensor has a resistance change rate with respect to strain as large as several tens of times that of the strain gauge using the metal thin film, and may measure fine strain. Further, in the strain gauge of the metal thin film, the resistance change is small and an external amplifier for amplification of obtained electrical signals is necessary. The semiconductor strain sensor has the larger resistance change, and the obtained electrical signals may be used without using the external amplifier and an amplifier circuit may be formed in the semiconductor chip of the semiconductor strain sensor, and thus, widespread application use and convenience in use are expected.

Here, when the semiconductor strain sensor is attached to an object to be measured and strain measurement is performed, a problem that, when the strain quantity of the object is larger, the semiconductor chip itself forming the semiconductor strain sensor is broken arises. In other words, the range of the strain quantity that can be measured by the semiconductor strain sensor is regulated by breaking strength of the semiconductor chip. For example, the measurable range of the semiconductor strain sensor using a silicon substrate is limited within a range in which the silicon substrate is not broken, and, for stable measurement, the measurable strain quantity range is equal to or less than $1000\mu\epsilon$ (hereinafter, $\epsilon$ is used as a sign showing the strain quantity).

Accordingly, the inventors conducted a study on the method of expanding the measurable strain quantity range of the semiconductor strain sensor. First, the inventors bonded and fixed another member (hereinafter, referred to as "base") between the semiconductor strain sensor and the object to be measured and made a study on a configuration of transmitting strain to the semiconductor strain sensor via the base. In other words, the semiconductor strain sensor was fixed onto the base and a study on a modularized mechanical quantity measuring device (sensor module) was made. In the case of the sensor module, strain generated in the object to be measured is transmitted to the semiconductor strain sensor via the base, and the strain quantity transmitted to the semiconductor strain sensor may be reduced by increasing rigidity of the base. On the other hand, as described above, the semiconductor strain sensor may measure fine strain, and thereby, may measure the small strain quantity transmitted to the semiconductor strain sensor via the base and calculate the strain quantity generated in the object to be measured based on the measurement result. That is, the upper limit of the measurable strain quantity rises and the measurable strain quantity range of the semiconductor strain sensor may be expanded.

However, the inventors made a further study, and found that the following new problem arises in the above described configuration. That is, it has been found that, when the rigidity of the base of the sensor module is increased, stress is generated in the bonding layer provided on a bonding interface between the object to be measured with strain and the base, and the bonding interface is separated or the bonding layer is broken. In other words, it has been found that the connection reliability between the object to be measured and the sensor module is lower.

The invention has been achieved in view of the above described problem, and an object thereof is to provide a technology of improving connection reliability between a mechanical quantity measuring device and an object to be measured.

Further, another object of the invention is to provide a technology of expanding a measurable range of the mechanical quantity measuring device.

The above described and other objects and new features of the invention will be made clear from the statement of the description and accompanying drawings.

Solution to Problem

This application contains a plurality of means for solving the problem, and an example thereof is as follows.

Namely, a mechanical quantity measuring device as an aspect of the invention has a semiconductor chip including a plurality of piezoresistive elements formed on a front surface of a semiconductor substrate, a lead wire unit electrically connected to a plurality of electrodes of the semiconductor chip, and a plate member joined to a rear surface of the semiconductor chip. Further, the plate member includes a first region facing the rear surface of the semiconductor chip and a second region provided on both sides with the first region in between, and a thickness of the plate member in the first region is made larger than a thickness in the second region.

Advantageous Effects of Invention

Of the inventions disclosed in this application, an effect obtained by a representative is briefly explained as follows.

Namely, connection reliability between a mechanical quantity measuring device and an object to be measured may be improved.

DESCRIPTION OF EMBODIMENTS

Figure 1:
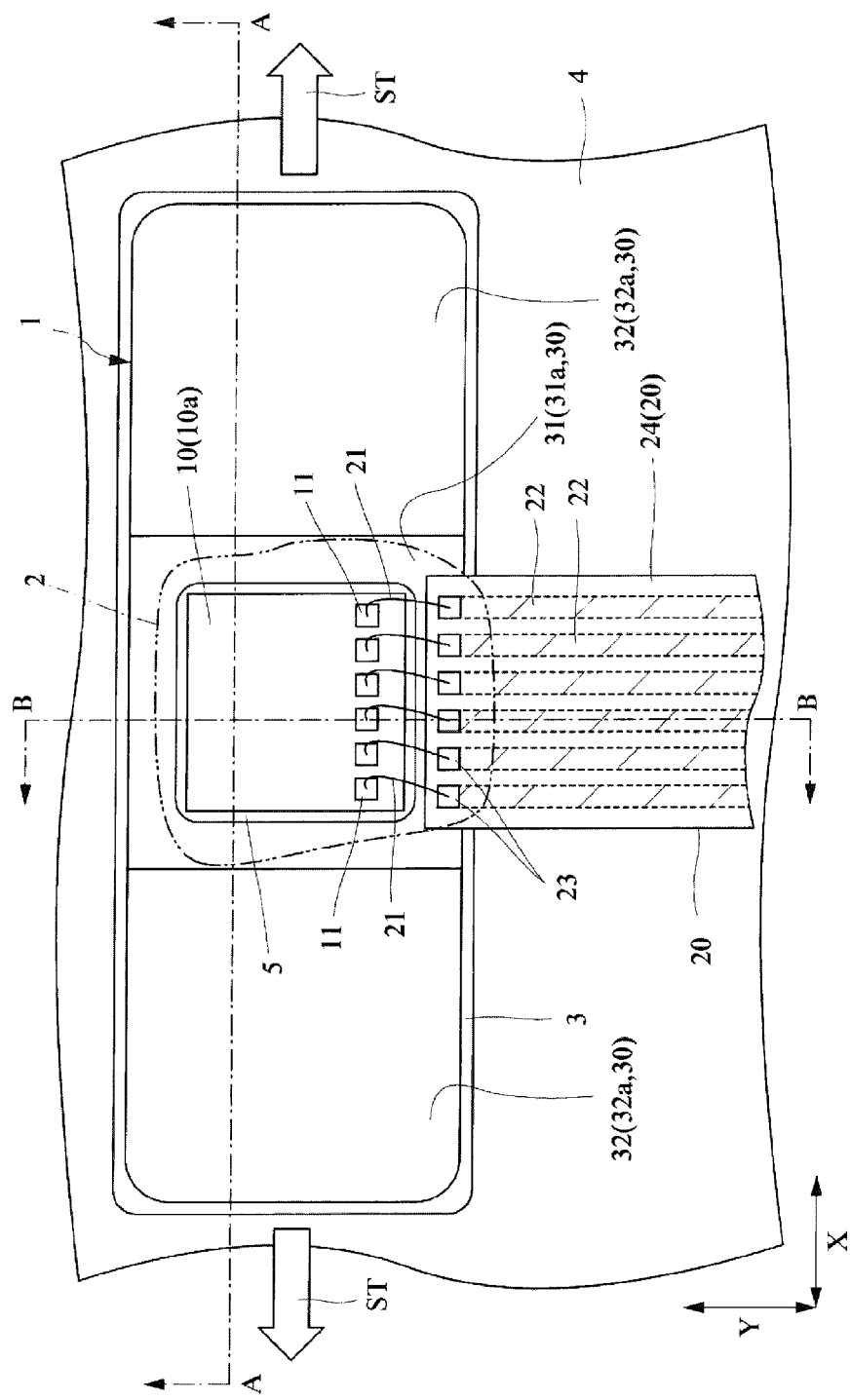
FIG. 1 is an enlarged plan view showing a state in which a mechanical quantity measuring device as one embodiment of the invention is bonded and fixed onto an object to be measured.

In the following embodiments, the same or similar parts are shown by the same or similar signs or reference numerals, and the explanation of the same or similar parts is not repeated except when particularly necessary. Further, in the following embodiments, when necessary for convenience, the explanation will be made by division into a plurality of sections or embodiments, however, they are not independent of each other except the case of being particularly explicit, and one has a relation as part or all of modified examples, details, supplemental explanation, or the like of the other. Furthermore, in the following embodiments, when the numbers of elements (including numbers, numeric values, amounts, ranges, etc.) are mentioned, except the case of being particularly explicit and the case of explicitly limiting to specified numbers on principle, the numbers are not limited to the specified numbers and may be more than or less than the specified numbers. Further, in the following embodiments, obviously, the component elements are not necessarily essential except the case of being particularly explicit and the case of being considered to be explicitly essential on principle or the like. Furthermore, in the following embodiments, obviously, regarding the component elements etc., when "comprising A", "consisting of A", "having A", "including A" are stated, except the case of particularly explicit description of only the element or the like, the other elements are not excluded. Similarly, in the following embodiments, when the shapes, position relationships, or the like of the component elements etc. are stated, except the case of being particularly explicit and the case of being explicitly considered not to be so on principle or the like, they include substantially approximate or similar shapes to the shapes or the like. This applies to the numeric values and ranges.

Further, in the accompanying drawings, when they become more complex or distinction from voids is clear, hatching etc. may be omitted even in sections. In this regard, in the case where they are clear from explanation or the like, background outlines may be omitted even with respect to holes closed in a plan. Furthermore, hatching may be provided not for sections, but for explicitly showing that they are not voids.

As below, the embodiments of the invention will be explained in detail with reference to the drawings. Note that, in all drawings for explanation of the embodiments, the members having the same functions have the same signs and their repetitive explanation will be omitted.

<Mechanical Quantity Measuring Device>

Figure 2:
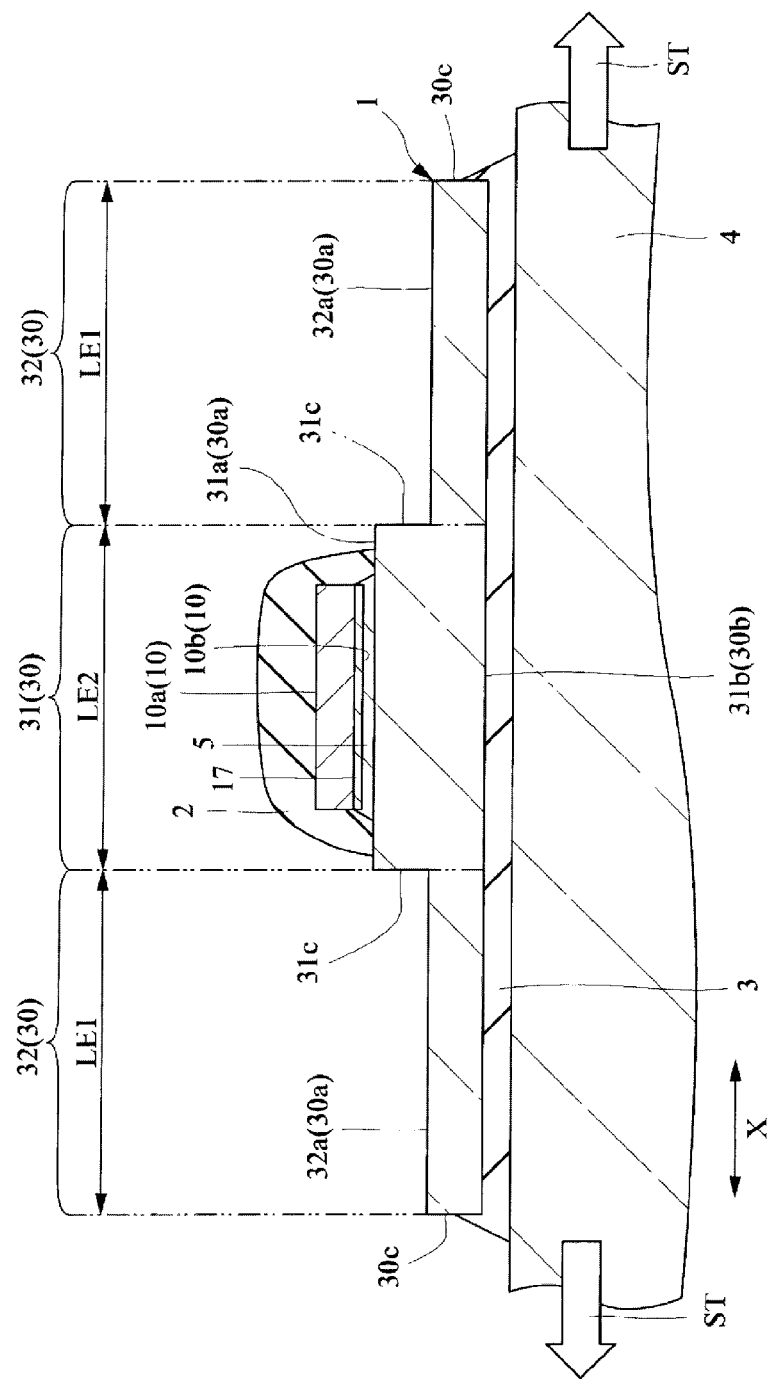
FIG. 2 is an enlarged sectional view along A-A line in FIG. 1.
Figure 3:
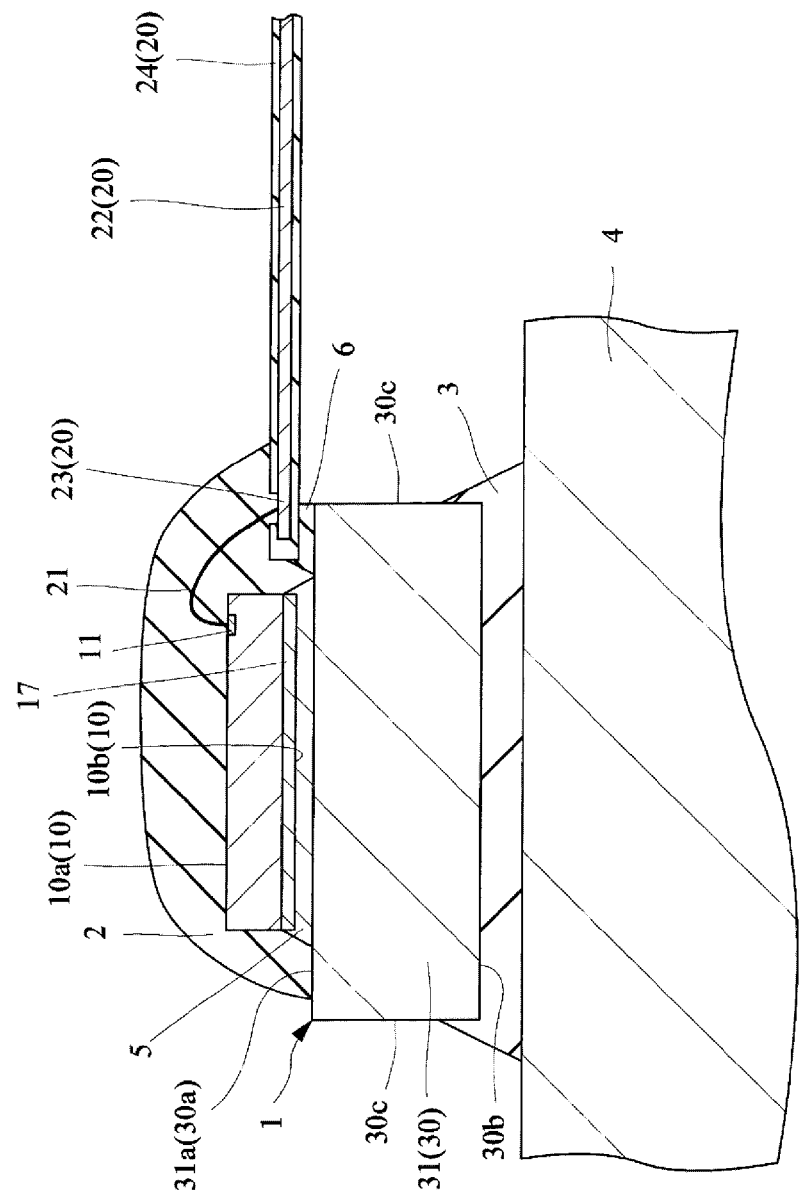
FIG. 3 is an enlarged sectional view along B-B line in FIG. 1.

First, a basic configuration of a mechanical quantity measuring device of the embodiment will be explained. FIG. 1 is a perspective plan view showing a state in which the mechanical quantity measuring device of the embodiment is bonded and fixed onto an object to be measured. Further, FIG. 2 is an enlarged sectional view along A-A line in FIG. 1, and FIG. 3 is an enlarged sectional view along B-B line in FIG. 1. Note that FIG. 1 shows the outline of a sealing member 2 by a dashed-two dotted line for showing an internal structure of the sealing member 2, and shows the internal structure through the sealing member 2. Further, FIG. 4 is a plan view schematically showing a configuration on a front surface side of a semiconductor chip shown in FIGS. 1 to 3, and FIG. 5 is a plan view schematically showing a configuration on a front surface side of a semiconductor chip as a modified example with respect to FIG. 4.

As shown in FIGS. 1 and 2, a sensor module 1 as the mechanical quantity measuring device of the embodiment has a semiconductor chip (sensor chip) 10 as a semiconductor strain sensor, a wiring unit (lead wire unit, flexible wiring board) 20 electrically connected to the semiconductor chip 10, a plate member (base) 30 on which the semiconductor chip 10 is mounted via a joining material 5, and the sealing member (resin member) 2 that seals the semiconductor chip 10. As shown in FIG. 2, the sensor module 1 is a strain measuring device having a lower surface (mount surface) 30b of the plate member 30 bonded and fixed to an object to be measured 4 via a bonding layer 3 of resin, for example, and transmitting strain loaded on the object to be measured 4 to the semiconductor chip 10 via the plate member 30 and measuring the strain transmitted to the semiconductor chip 10. In the embodiment, as shown by arrows ST in FIGS. 1 and 2, an example of measuring strain (tensile strain) loaded along the lower surface (mount surface) 30b of the plate member 30 (see FIG. 2) is taken for explanation.

The semiconductor chip 10 includes a front surface (principal surface) 10a and a rear surface (principal surface) 10b located on the opposite side to the front surface 10a as shown in FIG. 2. A metal film 17 is formed on the rear surface 10b of the semiconductor chip 10, and the rear surface 10b is covered by the metal film 17. The metal film 17 includes a multilayer film (metal multilayer film) in which chromium, nickel, gold (Cr, Ni, Au) are sequentially stacked from the semiconductor substrate side, for example, and may be formed by sputtering, for example. The rear surface 10b of the semiconductor chip 10 is covered by the metal film 17, and thereby, bonding strength to the metal joining material 5 such as solder may be improved. Further, the front surface 10a and the rear surface 10b respectively form rectangular shapes (square shapes) and, in the examples shown in FIGS. 4 and 5, for example, square shapes having a length of one side from about 2 mm to 3 mm. Further, as shown in FIGS. 4 and 5, the semiconductor chip 10 includes a plurality of resistor elements 12 formed in a sensor region 13 located in the center part on the front surface 10a side. Furthermore, the semiconductor chip 10 includes a plurality of electrodes (pads, electrode pads) 11 formed in an input/output circuit region 14 located closer to the peripheral edge side than the sensor region (core region) 13 on the front surface 10a side and electrically connected to the plurality of resistor elements (piezoresistive elements) 12. The plurality of resistor elements 12 include impurity diffusion regions formed by doping and diffusing an impurity on the element formation surface of a silicon substrate having (100) face, for example. The semiconductor chip 10 includes a sensing circuit (strain sensing circuit) 15 that senses strain by forming a Wheatstone bridge circuit by electrically connecting four resistor elements 12, for example, and measuring changes in resistance of the resistor elements 12 due to the piezoresistance effect. Further, the sensing circuit 15 is connected to the plurality of electrodes 11 via a plurality of wires 16. The plurality of electrodes 11 serve as input/output terminals of the semiconductor chip 10 and include a terminal Vcc that supplies a power supply potential (first power supply potential), a terminal GND that supplies a reference potential (second power supply potential), and a terminal SIG that outputs a sensing signal to the semiconductor chip 10.

Figure 4:
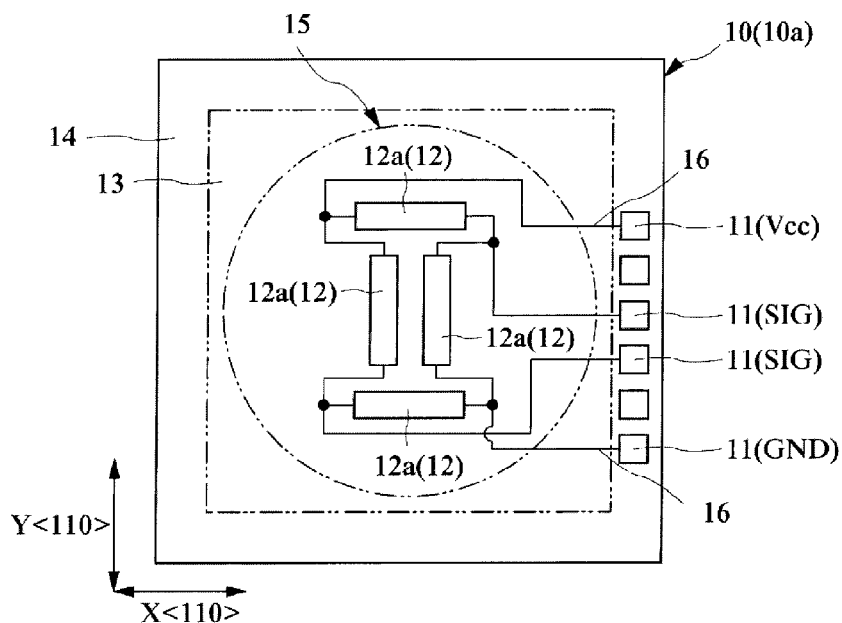
FIG. 4 is a plan view schematically showing a configuration on a front surface side of a semiconductor chip shown in FIGS. 1 to 3.
Figure 5:
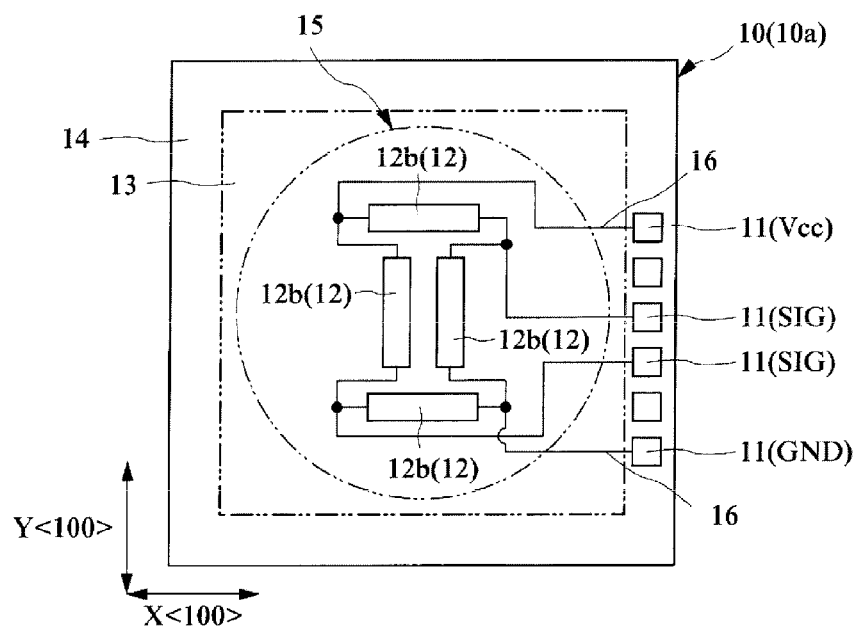
FIG. 5 is a plan view schematically showing a configuration on a front surface side of a semiconductor chip as a modified example with respect to FIG. 4.

Further, the layout of the plurality of resistor elements 12 forming the sensing circuit 15 is not limited to the modes shown in FIGS. 4 and 5, however, the following configuration is employed in the embodiment. That is, when the semiconductor substrate of the semiconductor chip 10 (e.g., silicon substrate of silicon (Si)) is single crystal (silicon single crystal), the extension directions (longitudinal directions) of the plurality of resistor elements 12 forming the sensing circuit 15 are respectively the same as <110> directions or <100> directions having (100) face. For example, in the example shown in FIG. 4, on the semiconductor substrate (silicon substrate) of the semiconductor chip 10, four p-type diffusion regions (regions doped with an impurity having the p conductivity type) are formed so that currents flow along the crystal orientation in <110> directions (the X-directions and Y-directions orthogonal to the X-directions in FIG. 4) of the silicon single crystal. In other words, in the semiconductor chip 10, a p-type impurity is doped in four locations to extend along the crystal orientation in <110> directions of the silicon single crystal of the silicon substrate and four resistor elements 12a are formed. Further, in the example shown in FIG. 5, on the semiconductor substrate (silicon substrate) of the semiconductor chip 10, four p-type diffusion regions (regions doped with an impurity having the p conductivity type) are formed so that currents flow along the crystal orientation in <100> directions (the X-directions and Y-directions orthogonal to the X-directions in FIG. 4) of the silicon single crystal. In other words, in the semiconductor chip 10, an n-type impurity is doped in four locations to extend along the crystal orientation in <100> directions of the silicon single crystal of the silicon substrate and four resistor elements 12b are formed.

As shown in FIGS. 4 and 5, the semiconductor chip 10 in which the extension directions (longitudinal directions) of the plurality of resistor elements 12 forming the sensing circuit 15 are respectively the same as <110> directions or <100> directions having (100) face may output a difference between the strain in the X-directions and the strain in the Y-directions as shown in FIGS. 4 and 5, for example. Specifically, the chip may output the difference between the strain in the X-directions and the strain in the Y-directions from the terminals SIG shown in FIGS. 4 and 5 as a potential difference. As described above, the measurement method of outputting the difference between the strain in the X-directions and the strain in the Y-directions is advantageous in view of reduction of the influence by thermal strain applied to the semiconductor chip 10. That is, as shown in FIG. 2, the semiconductor chip 10 is fixed onto the object to be measured 4 via the plurality of members (the bonding layer 3, the plate member 30, and the joining material 5 in FIG. 2), and thereby, when the measurement environment temperature changes, thermal strain due to differences in coefficient of linear extension of the respective members is generated. The thermal strain is a noise component different from the strain to be measured, and it is preferable to reduce the influence of the thermal strain. Here, as shown in FIGS. 4 and 5, when the planar shape of the semiconductor chip 10 is a square, the influences of the thermal strain are nearly equal in the X-directions and the Y-directions. Accordingly, for example, when the strain generated in the X-directions is detected, the difference between the strain in the X-directions and the strain in the Y-directions is output, and thereby, the strain quantity due to thermal strain may be cancelled out and the strain to be measured may be selectively detected. That is, the influence by thermal strain may be reduced using the semiconductor chip 10, and thus, variations in strain values due to changes in environmental temperature may be reduced. Further, the respective members including the resistor elements 12, the wires 16, and the electrodes 11 forming the semiconductor chip 10 may be formed by application of a known manufacturing technology of the semiconductor device, and microfabrication of the elements and the wires may be easier. Furthermore, the manufacturing efficiency may be improved and the manufacturing cost may be reduced.

Further, as shown in FIG. 2, the plate member 30 to which the semiconductor chip 10 is fixed includes an upper surface (chip mount surface) 30a, the lower surface (mount surface) 30b located on the opposite side to the upper surface 30a, and side surfaces 30c located between the upper surface 30a and the lower surface 30b. The plate member 30 has a function of relaxing stress (the strain quantity of the semiconductor chip 10) transmitted from the object to be measured 4 to the semiconductor chip 10, and preventing breakage of the semiconductor chip 10. The constituent material of the plate member 30 is not particularly limited, but it is preferable to format least the upper surface 31a as the chip mount surface using a metal in view of improvement in connection reliability to the joining material 5 because it is preferable to use a metal joining material such as solder for the joining material 5. Further, in view of suppression of breakage of the plate member 30 due to the influence by strain, it is preferable to form the whole plate member 30 using a metal material. Furthermore, in view of suppression of separation or breakage because of concentration of stress due to the influence by thermal strain on the bonding layer 3 for bonding and fixing the plate member 30 and the object to be measured 4, it is preferable to form the plate member 30 using a material having a coefficient of linear expansion close to that of the object to be measured 4, and particularly preferable to form the member using the same material as that of the object to be measured 4. In the embodiment, for example, the whole plate member 30 is made of iron (Fe), copper (Cu), aluminum (Al), the so-called stainless steel (iron alloy containing chromium element), the so-called duralumin (aluminum alloy), or the like.

Furthermore, in the example shown in FIG. 2, the plate member 30 includes a region on which the semiconductor chip is mounted (opposed to the rear surface 10b of the semiconductor chip 10) (chip mount region) 31 and regions 32 provided on both sides with the region 31 in between, and an upper surface (chip mount surface) 31a of the region 31 is provided in a location higher than upper surfaces 32a of the region 32. On the other hand, in the lower surface 30b, the region 31 and the regions 32 are provided at the same height and planarized. In other words, side surfaces 31c continuing to the upper surface 31a of the region 31 exist between the region 31 and the regions 32, and the region 31 projects upward (toward the semiconductor chip 10 side). Further, in other words, the thickness of the plate member 30 in the region 31 (the distance from the lower surface 30b to the upper surface 31a) is larger than the thicknesses of the regions 32 (the distances from the lower surface 30b to the upper surfaces 32a). Specifically, the regions 32 have the side surfaces 30c of the plate member 30 and the thicknesses of the regions 32 in the side surfaces 30c are smaller than the thickness of the region 31. Such an effect by providing the region 31 having the smaller thickness than that of the region 31 around the region 31 on which the semiconductor chip 10 is mounted will be described later.

Further, as shown in FIGS. 2 and 3, the joining material 5 that bonds and fixes the semiconductor chip 10 and the plate member 30 is provided between the semiconductor chip 10 and the plate member 30. The joining material 5 is provided to cover the whole rear surface 10b and parts of the side surfaces (parts at the rear surface 10b side). In other words, the peripheral edge of the joining material 5 spreads to the outside of the side surfaces of the semiconductor chip 10 and forms a fillet. In view of bonding and fixing of the semiconductor chip 10 and the plate member 30, the joining material 5 is not limited to a metal, but a resin bonding material such as a thermosetting resin may be used. However, in view of improvement in measurement accuracy of the semiconductor chip 10 as the semiconductor strain sensor, it is preferable to form the joining material 5 using a metal material. As described above, the sensor module 1 is the strain measuring device that transmits the strain generated in the object to be measured 4 to the semiconductor chip 10 via the plate member 30 and measures the strain transmitted to the semiconductor chip 10. Here, the strain generated in the object to be measured 4 is relaxed (decreases) by the plate member 30 before being transmitted to the semiconductor chip 10. The degree of relaxation varies depending on the rigidity of the plate member 30, and, in the embodiment, the strain is relaxed to the degree at which at least strain within a range not causing breakage (e.g., 1000µε or less) is generated in the semiconductor chip 10. That is, the strain quantity is smaller on the bonding interface between the semiconductor chip 10 and the plate member 30 than on the bonding interface between the object to be measured 4 and the plate member 30. In this regard, when the joining material 5 that bonds and fixes the semiconductor chip 10 and the plate member 30 is formed using a resin, the resin component in the adhesive relaxes stress under the condition that strain is loaded and the deformation state of the adhesive and the semiconductor chip 10 changes. As a result, the measurement accuracy of the semiconductor chip 10 (the accuracy of the measurement result with respect to strain generated in the object to be measured 4) becomes lower. On the other hand, when a metal material such as solder is used as the joining material 5, compared to the resin, stress relaxation is harder under the condition that strain is loaded, and the influence on the deformation state (strain state) of the semiconductor chip 10 is smaller using the joining material 5 of a metal material. That is, the joining material 5 is formed using a metal material such as solder, and thereby, the measurement accuracy of the semiconductor chip 10 (the accuracy of the measurement result with respect to strain generated in the object to be measured 4) may be improved compared to the case of using a resin. Further, in view of efficient execution of the step of fixing the semiconductor chip 10 onto the plate member 30, it is particularly preferable to form the joining material 5 using solder, however, when the joining material 5 of solder is used, it is considered that the joining material may become softer and relax stress depending on the environmental temperature. Therefore, it is preferable to use a material having a higher melting point of the joining material.

Furthermore, as shown in FIG. 1, the wiring unit 20 including a plurality of wires 22 electrically connected to the plurality of electrodes 11 of the semiconductor chip 10 is fixed to the upper surface 30a of the plate member 30. The wiring unit 20 is the so-called flexible wiring board in which the wiring unit 20 as a plurality of metal patterns are sealed within a resin film 24, and the respective parts of the plurality of wires 22 are exposed in openings provided in a part of the resin film 24 and the exposed portions form a plurality of terminals 23. Further, in the example shown in FIGS. 1 to 3, the plurality of electrodes 11 of the semiconductor chip 10 and the plurality of terminals 23 of the wiring unit 20 are electrically connected via a plurality of wires (conducting members) 21. Specifically, as shown in FIG. 3, a part of the wiring unit 20 is bonded and fixed onto the upper surface 31a of the region 31 as the chip mount region via a bonding material 6. Thereby, the distance between the terminal 23 of the wiring unit 20 and the electrode 11 (i.e., the connection distance by the wire 21) may be made smaller. The wires 21 are gold wires (Au wires) having wire diameters of about 10 µm to 200 µm and sealed by the sealing member 2. The wires 21 are covered by the sealing member 2, and thereby, short circuit between the adjacent wires 21 may be prevented. Furthermore, one end of the wiring unit 20 is fixed to the plate member 30 as shown in FIG. 3, and a connector (not shown), for example, is formed on the other end and electrically connected to a control circuit (illustration is omitted) for controlling strain measurement or the like. Note that, in FIGS. 1 to 3, the explanation has been made with the part of the flexible wiring board as the wiring unit 20 separately from the wires 21, however, a unit containing the plurality of wires 21 may be regarded as the wiring unit 20. Further, the wiring unit 20 is not limited to the mode shown in FIGS. 1 to 3, as long as the unit may transmit input/output currents between the semiconductor chip 10 and an external device (not shown).

Further, as shown in FIG. 2, the sensor module 1 is bonded and fixed to the object to be measured 4 via the bonding layer 3. Specifically, the object to be measured 4, the bonding layer 3, and the plate member 30 are sequentially stacked and bonded and fixed so that the lower surface 30b as the mounting surface of the plate member 30 and the sensor attachment surface (front surface, upper surface) of the object to be measured 4 may be opposed. The bonding layer 3 is provided to cover the whole lower surface 30b of the plate member 30 and parts of the side surfaces 30c (parts at the lower surface 30b side). In other words, the peripheral edge of the bonding layer 3 spreads to the outside of the side surfaces 30c of the plate member 30 and forms a fillet. The constituent material of the bonding layer 3 is not particularly limited, but, in view of facilitation of the attachment to the object to be measured 4, an adhesive of a resin such as a thermosetting resin, for example, is preferably used. In the embodiment, the bonding layer 3 is formed using an adhesive generally used when a strain gauge is attached and when the semiconductor chip as the semiconductor strain sensor is bonded and fixed to the object to be measured, for example, two-pack or one-pack epoxy resin. As described above, when the sensor module 1 is fixed using a thermosetting resin, for example, the adhesive is applied to the lower surface 30b of the plate member 30, the sensor module 1 is pressed against the object to be measured 4 for attachment, heated to a curing temperature, and heated and cured for fixing. Here, as described above, when the plate member 30 and the object to be measured 4 are bonded via the resin bonding layer 3, the bonding layer 3 relaxes stress under the condition that strain is loaded. Further, the stress relaxation by the bonding layer 3 is especially larger in the peripheral edge of the bonding layer 3. Therefore, the influence by the stress relaxation is smaller around the center part on which the semiconductor chip 10 is mounted, and the influence on the strain state of the semiconductor chip 10 is smaller. That is, even in the case where the bonding layer 3 provided on the object to be measured 4 and the plate member 30 is formed using a resin (including the case where a plurality of metal particles are mixed in a resin), the influence on degradation in measurement accuracy of the semiconductor chip 10 is smaller.

<Strain Measurement Method>

Figure 6:
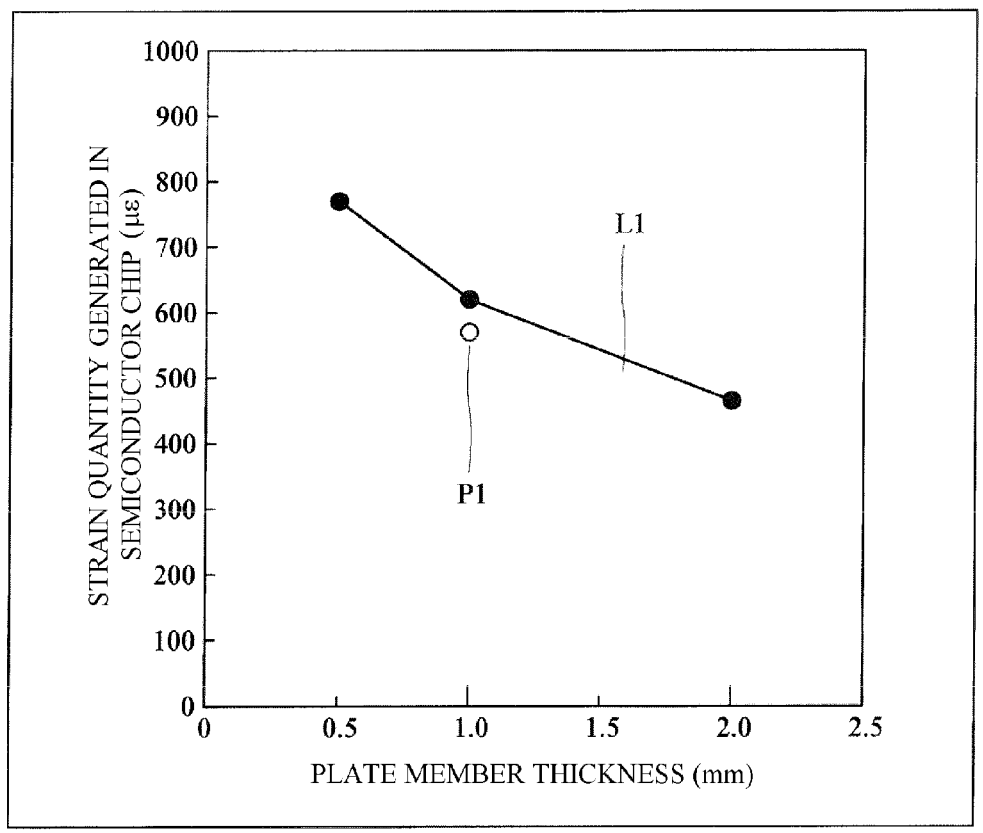
FIG. 6 is an explanatory diagram showing a relationship between a thickness of a plate member on which the semiconductor chip is mounted and a strain quantity generated in the semiconductor chip.
Figure 7:
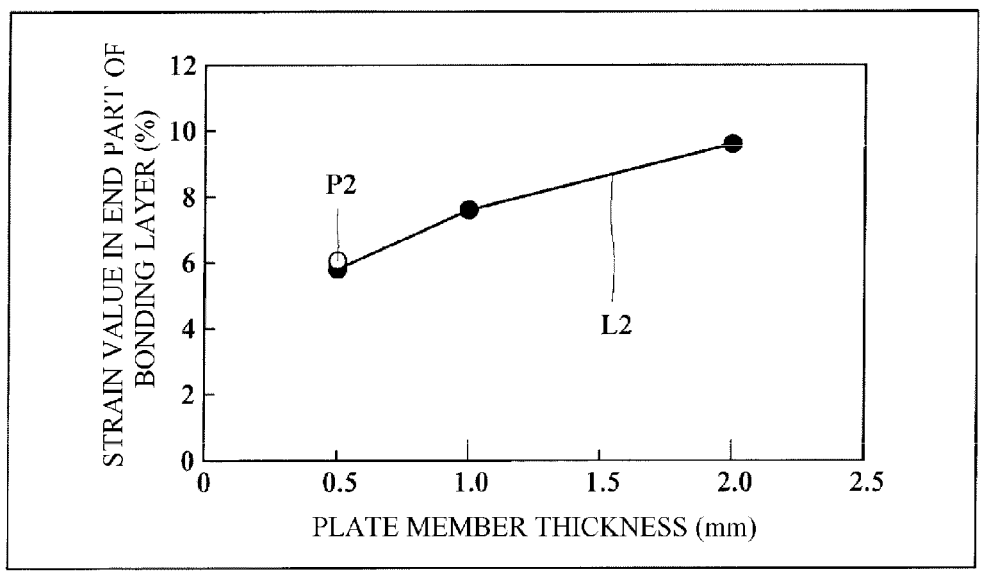
FIG. 7 is an explanatory diagram showing a relationship between the thickness of the plate member on which the semiconductor chip is mounted and the strain generated in an end part of a bonding layer for bonding and fixing the plate member.
Figure 17:
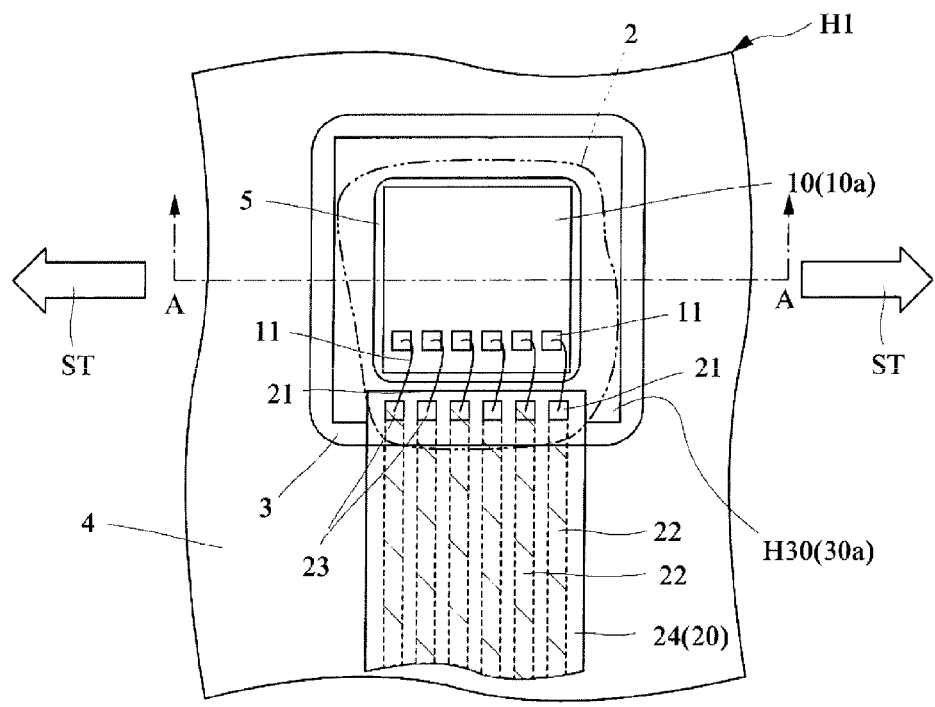
FIG. 17 is a perspective plan view showing a state in which a mechanical quantity measuring device as a comparative example with respect to FIG. 1 is bonded and fixed onto an object to be measured.
Figure 18:
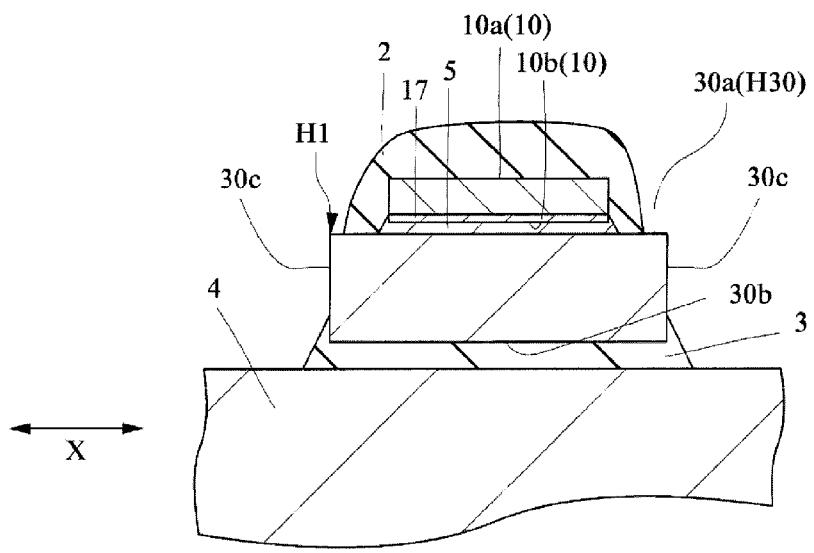
FIG. 18 is a sectional view along A-A line in FIG. 17.

Next, a strain measurement method using the sensor module 1 explained using FIGS. 1 to 5 will be explained. FIG. 6 is an explanatory diagram showing a relationship between the thickness of the plate member on which the semiconductor chip is mounted and the strain quantity generated in the semiconductor chip. Further, FIG. 7 is an explanatory diagram showing a relationship between the thickness of the plate member on which the semiconductor chip is mounted and strain generated in an end part of the bonding layer for bonding and fixing the plate member. Furthermore, FIG. 17 is a perspective plan view showing a state in which a mechanical quantity measuring device as a comparative example with respect to FIG. 1 is bonded and fixed onto an object to be measured. In addition, FIG. 18 is a sectional view along A-A line in FIG. 17.

First, a reason that, by fixation of the semiconductor chip 10 to the object to be measured via the plate member 30 explained using FIGS. 1 to 5, even when strain exceeding 1000µε is generated in the object to be measured 4, for example, measurement may be performed will be explained. Note that FIG. 6 shows the relationship between the thickness of the plate member on which the semiconductor chip is mounted and the strain quantity generated in the semiconductor chip obtained using a finite element method (FEM) analysis, however, for simplicity, in a structure of a sensor module H1 shown in FIGS. 17 and 18, with the thickness of the plate material as a parameter, a relationship with a strain value (strain quantity) generated at the center of the front surface 10a of the semiconductor chip 10 when tensile strain of 1000µε is applied to the object to be measured 4 is shown. Further, FIG. 7 shows the strain value (strain quantity) generated in the end part of the bonding layer 3 (immediately under the peripheral edge of the regions 32) with the thickness of the plate material as a parameter under the same condition as that in FIG. 6. The sensor module H1 shown in FIGS. 17 and 18 is different in that a plate member H30 does not include the regions 32 (thin plate regions) like the plate member 30 shown in FIGS. 1 to 3. The other points are the same as those of the sensor modules 1 shown in FIGS. 1 to 3. Further, the analysis was made with the object to be measured 4 and the plate member formed using duralumin and the joining material 5 as high-temperature solder.

As shown in FIG. 17, in the sensor module H1, the semiconductor chip 10 is fixed onto the upper surface 30a of the plate member 30 via the joining material 5 and bonded and fixed to the object to be measured 4 via the bonding layer 3. Here, FIG. 6 shows the strain value (strain quantity) generated at the center of the front surface 10a of the semiconductor chip 10 in response to the thickness of the plate member H30 in the case where tensile strain is loaded in directions shown by arrows ST in FIG. 17. As shown in FIG. 6 as a line L1, it is known that the strain quantity generated in the semiconductor chip 10 decreases by about 25% with respect to the strain loaded on the object to be measured 4 (1000µε) if the plate member thickness is at least equal to or more than 0.5 mm. Further, it is known that, when the plate member thickness becomes larger, the strain quantity generated in the semiconductor chip 10 further decreases and, for example, if the plate member thickness is 1 mm, decreases by about 40% and, if the plate member thickness is 2 mm, decreases by about 50%. The strain quantity generated in the semiconductor chip 10 becomes smaller in response the plate member thickness as described above is considered to be on the following reason.

When the semiconductor chip 10 is directly attached to the object to be measured 4, the strain quantity of the tensile strain shown by the arrows ST in FIG. 17 and the strain quantity generated in the semiconductor chip 10 are nearly the same. On the other hand, as shown in FIGS. 17 and 18, when the sensor module H1 is fixed to the object to be measured 4 and the tensile strain is loaded thereon, tensile strain is also generated in the semiconductor chip 10 via the bonding layer 3, the plate member H30, and the joining material 5, and the strain quantity is sensed and output by the strain sensing circuit formed on the front surface of the semiconductor chip 10. Here, on the bonding interface between the plate member H30 and the object to be measured 4 (i.e., the bonding layer 3), the rigidity of the plate member H30 is larger than the rigidity of the bonding layer 3, and shear deformation is generated in the bonding layer 3. Then, the amount of deformation at the upper surface (the surface in contact with the lower surface (bottom surface) 30*b* of the plate member H30) side of the bonding layer 3 is smaller than the amount of deformation at the lower surface side (the surface in contact with the object to be measured 4). That is, the generated strain is relaxed by the bonding layer 3. Therefore, the strain generated in the upper surface (chip mount surface) 30*a* of the plate member H30 decreases to less than the strain loaded on the object to be measured 4. Here, if the thickness of the plate member H30 is increased, the rigidity of the plate member H30 increases, and shear strain generated in the bonding layer 3 increases and the strain generated in the upper surface 30*a* of the plate member H30 decreases. As a result, the strain quantity transmitted to the semiconductor chip 10 decreases.

Further, the above described phenomenon that the strain quantity generated in the semiconductor chip 10 becomes smaller in response to the plate member thickness may be similarly considered in the sensor module 1 shown in FIGS. 1 to 3. That is, when the sensor module 1 shown in FIGS. 1 to 3 is fixed to the object to be measured 4 and strain is measured, shear deformation is generated in the bonding layer 3 due to the plate member 30 having the larger rigidity than that of the bonding layer 3. Accordingly, the amount of deformation at the upper surface (the surface in contact with the lower surface (bottom surface) 30*b* of the plate member H30) side of the bonding layer 3 is smaller than the amount of deformation at the lower surface side (the surface in contact with the object to be measured 4). That is, the generated strain is relaxed by the bonding layer 3. Therefore, the strain generated in the upper surface (chip mount surface) 30*a* of the plate member 30 decreases to less than the strain loaded on the object to be measured 4. Here, as a determinant for the degree of relaxation of strain generated in the semiconductor chip 10, the thickness of the region 31 with the semiconductor chip 10 mounted thereon (the distance from the upper surface 31*a* to the lower surface 30*b*) is dominant. Therefore, the thickness of the plate member shown in FIG. 6 may be applied in place of the thickness of the region 31. For example, if the thickness of the region 31 is set to 0.5 mm, the strain generated in the semiconductor chip 10 decreases by about 25% with respect to the strain (e.g., 1000με) loaded on the object to be measured 4. Further, if the thickness of the region 31 is 1 mm, the strain decreases by about 40% and, if the thickness of the region 31 is 2 mm, the strain decreases by about 50%.

As described above, in the sensor module 1 shown in FIGS. 1 to 3 and the sensor module H1 shown in FIGS. 17 and 18, the semiconductor chip 10 is not directly mounted on the object to be measured 4, but mounted via the plate member 30 (plate member H30). Thereby, the strain generated in the semiconductor chip 10 may be reduced and, even when the strain loaded on the object to be measured 4 is strain exceeding 1000με, for example, breakage of the semiconductor chip 10 may be prevented or suppressed. Further, the degree of relaxation of the strain may be adjusted by the thickness of the region 31 of the plate member 30. Furthermore, the semiconductor chip 10 as the semiconductor strain sensor is advantageous in measurement of fine strain as described above, and thereby, the decreased strain quantity may be measured with the higher accuracy and the strain quantity generated in the object to be measured may be calculated based on the measurement result. That is, the upper limit of the measurable strain quantity rises, and thereby, the measurable strain quantity range of the semiconductor strain sensor may be expanded.

However, according to the study by the inventors, it has been found that, when the thickness of the plate member H30 of the sensor module H1 shown in FIGS. 17 and 18 is made larger and the rigidity of the plate member H30 increases, separation of the bonding interface between the bonding layer 3 and the plate member H30, separation of the bonding interface between the bonding layer 3 and the object to be measured 4, or breakage of the bonding layer 3 occurs. Specifically, it has been found that, in the plan view, separation or crack occurs in the peripheral edge of the bonding layer 3 and the separation or crack extends toward the center part of the bonding layer 3. The separation or crack occurs due to concentration of stress on the bonding layer 3 when strain is loaded on the object to be measured 4. That is, when strain (e.g., tensile strain shown in FIG. 17) is loaded on the object to be measured 4, the object to be measured 4, the bonding layer 3, and the plate member H30 are respectively deformed in response to the loaded strain, and shear deformation is generated in the bonding layer 3 because the amount of deformation of the plate member H30 is smaller than the amount of deformation of the object to be measured 4. The stress by the shear deformation becomes the maximum in the peripheral edge of the bonding layer 3 (immediately under the side surfaces 30*c*) in the plan view. As a result, separation or crack occurs in the peripheral edge of the bonding layer 3. The separation or crack due to shear deformation occurs in the peripheral edge (end) of the bonding layer 3 in the plan view. This is because the stress generated by the shear deformation concentrates on the peripheral edge of the bonding layer 3, specifically, the bonding interface between the peripheral edge of the plate member H30 and the bonding layer 3. Further, when separation or crack occurs in the peripheral edge of the bonding layer 3, it starts from the occurrence location of the peripheral edge and extends toward the center part (the center part in the plan view) of the bonding layer 3. That is, the connection reliability between the object to be measured 4 and the sensor module H1 becomes lower. Specifically, as shown in FIG. 7 as a line L2, it has been found that, as the thickness of the plate member is larger to be 0.5 mm, 1 mm, 2 mm, the strain value (strain quantity) becomes larger to be about 5.8%, about 7.7%, and about 10%. That is, in consideration of the combination of the results shown in FIGS. 6 and 7, it is known that, in view of reduction of the strain quantity generated in the semiconductor chip 10 shown in FIGS. 17 and 18, it is preferable to increase the thickness of the plate member H30, however, when the thickness of the plate member H30 is increased, strain is generated in the bonding layer 3 and separation and crack easily occurs.

Accordingly, the inventors conducted a study on a configuration of preventing or suppressing occurrence of separation or crack in the bonding layer 3, and found out the configuration of the sensor module 1 shown in FIGS. 1 to 3. That is, the plate member 30 of the sensor module 1 includes the region 31 opposed to the rear surface 10b of the semiconductor chip 10 and the regions 32 provided on both sides with the region 31 in between, and the thickness of the plate member 30 in the region 31 is larger than the thicknesses in the regions 32. In other words, the semiconductor chip 10 is mounted on the region 31 of the plate member 30 having a first thickness and the regions 32 having a second thickness smaller than the first thickness are provided around the region 31. Further, the bonding layer 3 is provided to cover the region 31 and the regions 32. As described above, the rigidity of the plate member 30 is lower in the regions 32 having the smaller thickness than in the region 31. When large strain (strain to be measured) is generated in the object to be measured 4, deformation of the regions 32 with the lower rigidity is easier than that of the region 31 with the higher rigidity. Accordingly, at the interface between the region 31 and the bonding layer 3, the stress generated due to shear deformation may be reduced. Further, as shown in FIG. 1, the regions 32 having the smaller thickness than that of the region 31 extends to the peripheral edge of the plate member 30. Therefore, the regions 32 having the smaller thickness are provided in the ends of the plate member 30 in the directions in which strain is loaded in the plan view.

Here, as described above, the separation or crack occurring in the bonding layer 3 occurs in the peripheral edge of the bonding layer 3 in the plan view, and then, extends toward the center part. Further, separation or crack does not occur in the center part unless separation or crack occurs in the peripheral edge of the bonding layer 3. That is, if it may be possible to prevent occurrence of separation or crack in the peripheral edge of the bonding layer 3, the connection reliability to the object to be measured 4 may be improved. Furthermore, according to the embodiment, the regions 32 of the plate member 30 are provided on the peripheral edge of the bonding layer 3 in the direction in which strain is loaded in the plan view, and stress generated due to shear deformation may be reduced. That is, the regions 32 of the plate member 30 are provided in the region in which separation and crack are mostly liable to occur in the bonding layer 3, and thereby, stress generated due to shear deformation may be reduced and occurrence of separation and crack may be prevented or suppressed. On the other hand, as described above, the degree of relaxation of the strain transmitted to the semiconductor chip 10 is regulated by the thickness of the region 31 (see FIG. 2) on which the semiconductor chip 10 is mounted, and thereby, even when the regions 32 having the smaller thickness are provided near the peripheral edge of the bonding layer 3, the influence on the strain transmitted to the semiconductor chip 10 is smaller. Therefore, the sensor module 1 shown in FIGS. 1 to 3 may perform measurement even when strain exceeding 1000με is generated in the object to be measured 4, for example, and may improve the connection reliability between the object to be measured 4 and the plate member 30.

To confirm the above described advantages, results of the analysis using the finite element method performed on the sensor module 1 having the structure shown in FIGS. 1 to 3 are shown in FIGS. 6 and 7. Specifically, the analysis results in the case where the thickness of the plate member 30 in the region 31 shown in FIG. 2 is set to 1 mm and the thickness of the plate member 30 in the regions 32 is set to 0.5 mm and tensile strain of 1000με is applied in directions shown by the arrows ST of the object to be measured 4 are shown. As results of the analysis, as shown in FIG. 6 as a plot P1, the strain value generated at the center of the front surface 10a of the semiconductor chip 10 (see FIG. 2) is about 570με and decreases by about 40% with respect to the strain (e.g., 1000με) loaded on the object to be measured 4. That is, the effect of reducing the strain generated in the semiconductor chip 10 is nearly equal to that when the thickness of the whole plate member H30 shown in FIG. 18 is set to 1 mm. On the other hand, as shown in FIG. 7 as a plot P2, the strain quantity generated in the ends (peripheral edge) of the bonding layer 3 (see FIG. 2) is about 5.8% with respect to the strain (e.g., 1000με) loaded on the object to be measured 4. That is, the effect of reducing the strain generated in the ends of the bonding layer 3 is nearly equal to that when the thickness of the whole plate member H30 shown in FIG. 18 is set to 0.5 mm. As described above, in the strain measuring method using the sensor module 1 explained using FIGS. 1 to 5, damage on the semiconductor chip 10 and occurrence of separation or crack in the bonding layer 3 may be respectively prevented or suppressed. As a result, the connection reliability between the sensor module 1 and the object to be measured 4 may be improved and strain may be stably measured.

Preferred Embodiments

Next, preferred embodiments of the sensor module 1 will be explained.

First, as shown in FIG. 1, the four corners (four corner parts) of the plate member 30 form arc shapes in the plan view. When strain is loaded on the object to be measured 4, stress is most liable to be concentrated on the four corners of the plate member 30. Therefore, it is preferable to process the four corners to respectively form the arc shapes as shown in FIG. 1. Thereby, the stress may be distributed, and strain concentration in the bonding layer 3 may be relaxed around the respective corners and occurrence of separation or crack may be suppressed. Further, the corners are formed in the arc shapes, and thereby, the stress generated in the plate member 30 itself may be relaxed (distributed). Accordingly, fatigue fracture of the plate member 30 may be suppressed. Furthermore, though not illustrated, as a modified example with respect to FIG. 2, regions in which the side surfaces 31c and the upper surface 31a of the region 31 intersect may be formed in arc shapes in a side view. In other words, the boundary parts between the region (thick plate part) 31 and the regions (thin plat parts) 32 are formed in arc shapes in the side view. In this case, concentration of stress on the boundary parts between the regions 31, 32 may be suppressed, and thereby, fatigue fracture in the parts may be suppressed. The plate member 30 may be formed by etching processing, mechanical cutting processing or press processing on a flat plate, for example, and, in the case of etching processing, the boundary parts between the regions 31, 32 may be easily formed in the arc shapes.

Further, as described above, the regions 32 reduce the rigidity in the peripheral edge of the plate member 30, and thereby, suppresses occurrence of separation or crack of the bonding layer 3. Accordingly, it is preferable that the total area of the regions 32, i.e., the area of the thin region having the lower rigidity is larger than the area of the region 31. Furthermore, as shown in FIG. 2, it is particularly preferable that the distance LE1 from the peripheral edge of the region 32 to the boundary with the region 31 is equal to or larger than the length LE of one side of the region 31.

Further, in view of reduction of the influence of thermal strain transmitted to the semiconductor chip 10, it is preferable that the region 31 on which the semiconductor chip 10 is mounted is formed in a square in the plan view as shown in FIG. 1. In the example shown in FIG. 1, the semiconductor chip 10 is mounted in the center part of the region 31 having the square shape. As described above, the semiconductor chip 10 of the embodiment is the strain sensor that outputs the difference between the strain in the X-directions (see FIGS. 4, 5) and the strain in the Y-directions (see FIGS. 4, 5). Furthermore, if the planar shape of the region 31 is square, the influences of thermal strain generated in the plate member 30 may take nearly the same values in the X-directions and the Y-directions. Therefore, the shape of the region 31 on which the semiconductor chip 10 is mounted is square and the semiconductor chip 10 is fixed to the center of the region 31 (so that the center of the upper surface 31a may coincide with the center of the rear surface of the semiconductor chip 10), and thereby, the strain quantity due to thermal strain may be cancelled out and strain to be measured may be selectively detected. In other words, the semiconductor chip 10 is provided at the center of the region 31 having the square shape in the plan view, and thereby, the influence on the plate member 30 by thermal strain transmitted to the semiconductor chip 10 may be reduced.

Further, in the example shown in FIG. 1, the plate member 30 has a rectangular shape in the plan view. Specifically, it has a quadrilateral shape having two long sides opposed to each other and two short sides provided to intersect with the respective two long sides. In the case of strain measurement, specifically, in the case where a large strain quantity by which the semiconductor chip 10 breaks when the semiconductor chip 10 is directly attached to the object to be measured 4 is measured, the directions of generation of the strain to be measured are often known in advance. In the example shown in FIG. 1, strain generated in the X-directions as shown by the arrows ST (the directions along the lower surface 30b shown in FIG. 2) is a measurement mode. In this case, the directions in which the long sides of the plate member 30 are provided, i.e., the longitudinal directions of the plate member 30 may be fixed to coincide with the directions of generation of the strain to be measured. In other words, the regions 32 are provided on both sides of the region 31 along the longitudinal directions that coincide with the directions of generation of the strain to be measured, and no region 32 is provided in the directions along the short sides. In the case where the directions of generation of strain are known as described above, regions having the smaller thickness are provided along the directions of generation, and thereby, the planar shape may be formed in a rectangular shape. Furthermore, the above described influence of the thermal strain transmitted to the semiconductor chip 10 is particularly larger near the chip mount part. Accordingly, the planar shape of the region 31 on which the semiconductor chip 10 is mounted is formed in the square shape, and thereby, even when the regions 32 having the smaller (thinner) thickness do not uniformly spread around the region 31, the influence of the thermal strain generated in the plate member 30 may be reduced. As described above, the shape of the plate member 30 is formed to be rectangular, and thereby, the planar size of the sensor module 1 may be reduced. Accordingly, the area necessary for fixing the sensor module 1 (mount area) may be reduced. In other words, versatility of the sensor module 1 may be improved.

Figure 8:
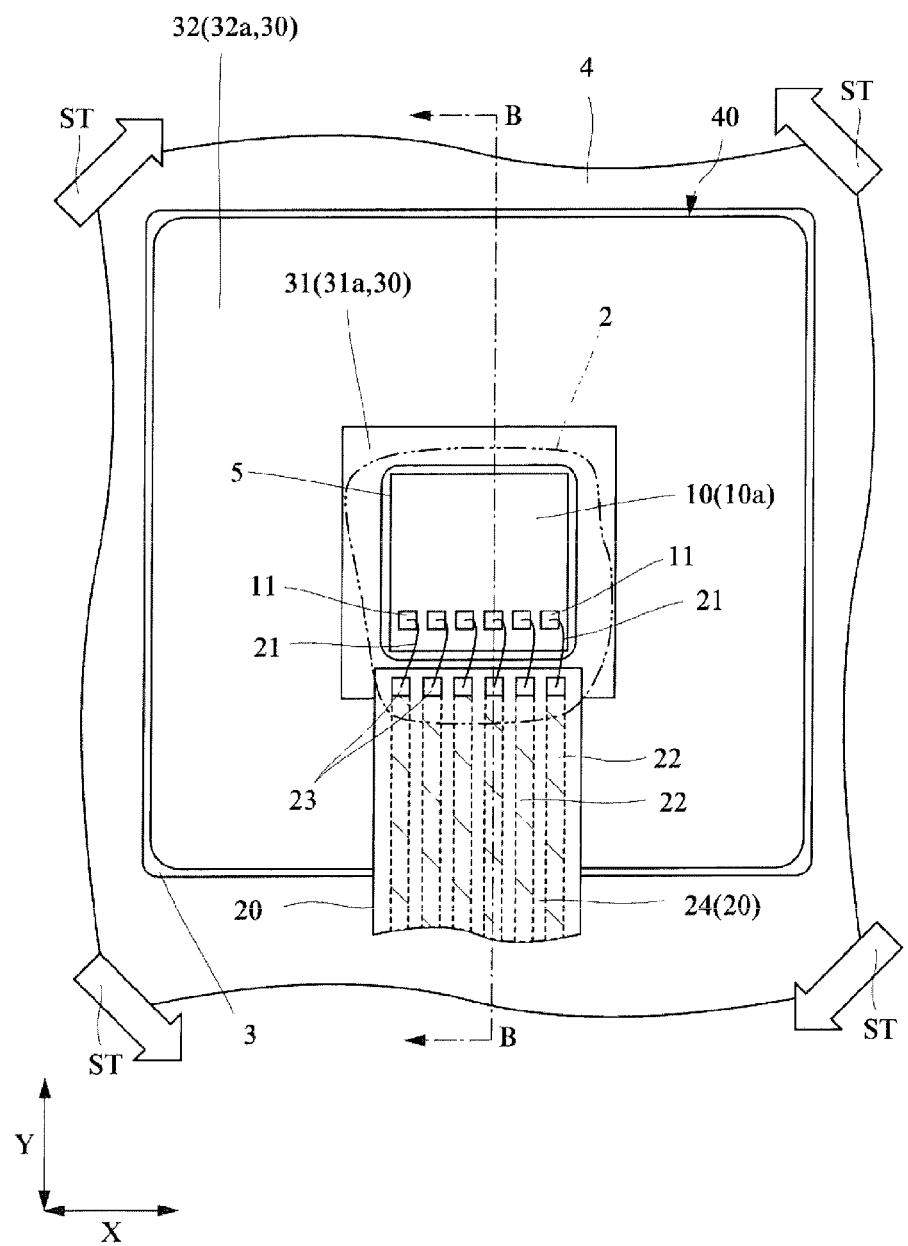
FIG. 8 is a perspective plan view showing a state in which a mechanical quantity measuring device as a modified example with respect to the mechanical quantity measuring device shown in FIG. 1 is bonded and fixed onto an object to be measured.
Figure 9:
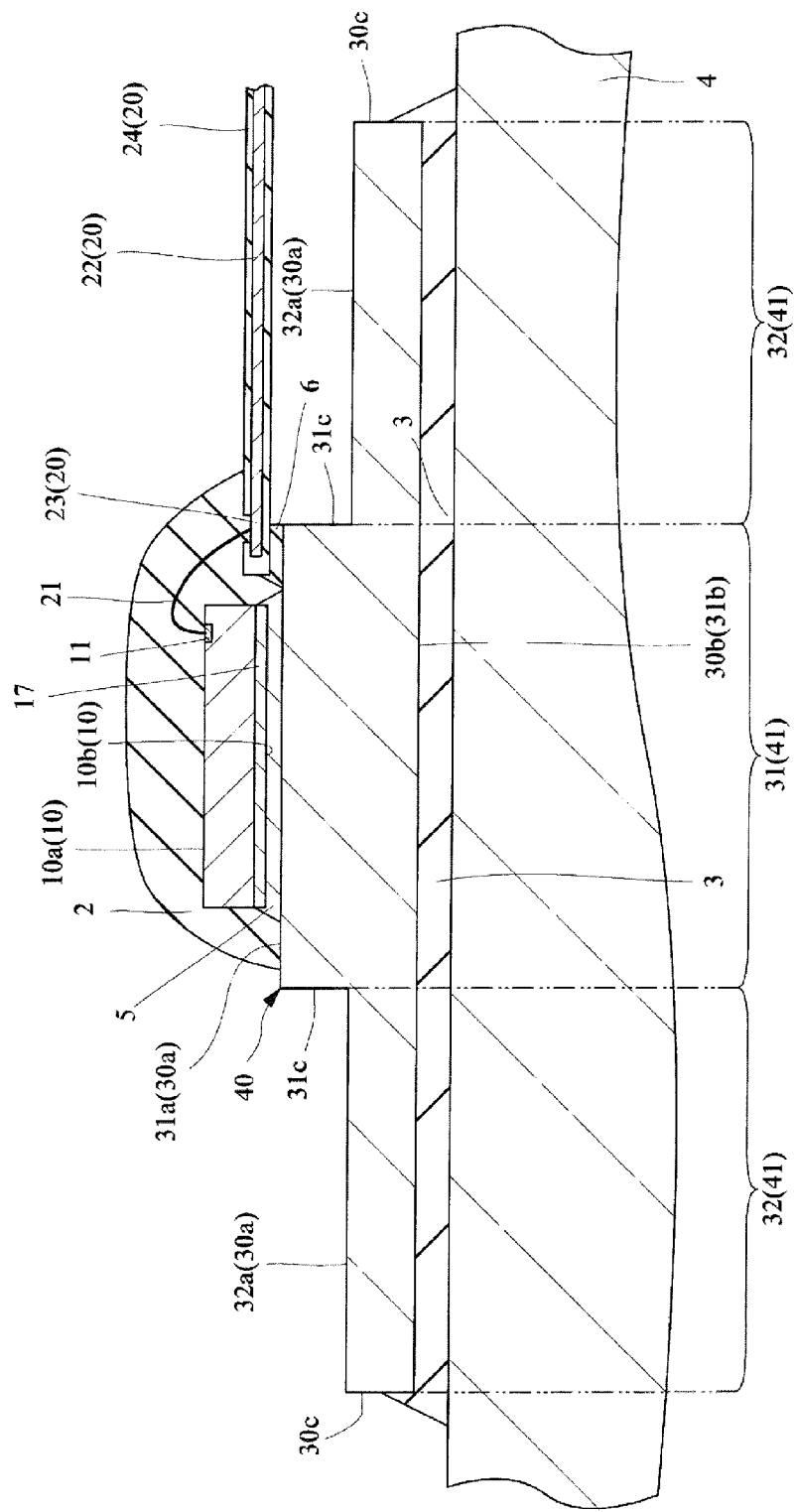
FIG. 9 is an enlarged sectional view along B-B line in FIG. 8.

Note that, in view of respective prevention or suppression of damage on the semiconductor chip 10 and occurrence of separation or crack in the bonding layer 3, the shape of the plate member 30 is not limited to the rectangular shape. For example, like a plate member 41 of a sensor module 40 shown in FIGS. 8 and 9, a region 32 may be provided to continuously surround the region 31 and the planar shape of the plate member 41 may be formed in a square shape. FIG. 8 is a perspective plan view showing a state in which a mechanical quantity measuring device as a modified example with respect to the mechanical quantity measuring device shown in FIG. 1 is bonded and fixed onto an object to be measured. Further, FIG. 9 is an enlarged sectional view along B-B line in FIG. 8. The sensor module 40 shown in FIGS. 8 and 9 is different from the sensor module 1 shown in FIG. 1 in that the region 32 of the plate member 41 is provided to continuously surround the region 31. The other points are the same as those of the sensor module 1, and the duplicated explanation will be omitted.

The plate member 41 of the sensor module 40 includes the region 31 having a first thickness and the region 32 having a second thickness smaller than the first thickness as shown in FIG. 9, and the region 32 is provided to continuously surround the region 31 as shown in FIG. 8. Further, the planar shape of the plate member 41 is square. Furthermore, the region 31 is provided at the center of the region 32. In other words, the plate member 41 includes the region 31 provided at the center of the region 32 in the plan view. The structure of the sensor module 40 may reduce the influence of thermal strain with the higher accuracy than the sensor module 1 because the shape of the whole plate member 41 is square. Further, the structure of the sensor module 40 shown in FIG. 8 is effective for application to the case where the direction of generation of strain to be measured is unknown. The region 32 is uniformly provided around the region 31 as the chip mount region shown in FIG. 8, and thereby, occurrence of separation or crack in the bonding layer 3 may be suppressed regardless of the direction of generation of strain. Furthermore, the sensor module 1 shown in FIG. 1 is suitable for measurement of tensile strain or compressive strain, however, the sensor module 40 shown in FIG. 8 may reliably measure shear strain (e.g., shear strain due to distortion of a cylindrical member or the like) shown in FIG. 8 with arrows ST, for example. When the shear strain is loaded as shown in FIG. 8, compressive strain is generated in the X-directions and tensile strain is generated in the Y-directions. Here, the semiconductor chip 10 outputs the difference between the strain in the X-directions and strain in the Y-directions, and thereby, may output a value proportional to the shear strain shown in FIG. 8. Furthermore, even when the shear strain as shown in FIG. 8 is loaded, occurrence of separation or crack in the bonding layer 3 may be suppressed. Therefore, with the strain generated in the directions along the lower surface 30b of the plate member 41, degradation in connection reliability between the object to be measured 4 and the sensor module 40 may be suppressed and stable measurement may be performed.

Further, in the sensor module 1 shown in FIGS. 1 to 3 and the sensor module 40 shown in FIGS. 8 and 9, the lower surfaces 30b of the plate members 30, 41 have flat structures. In other words, the region 31 on which the semiconductor chip 10 is mounted has a shape projecting toward the upper surface 30a side. As described above, the whole lower surfaces 30b of the plate members 30, 41 have the flat structures, and thereby, when being bonded and fixed to the object to be measured 4, fixing of the sensor modules 1, 40 at tilts with respect to the upper surface of the object to be measured 4 may be suppressed. Furthermore, the fixing of the sensor modules 1, 40 at tilts with respect to the object to be measured 4 is suppressed, and thereby, variations in strain quantity (stress) transmitted from the object to be measured 4 to the plate members 30, 41 may be suppressed.

Figure 10:
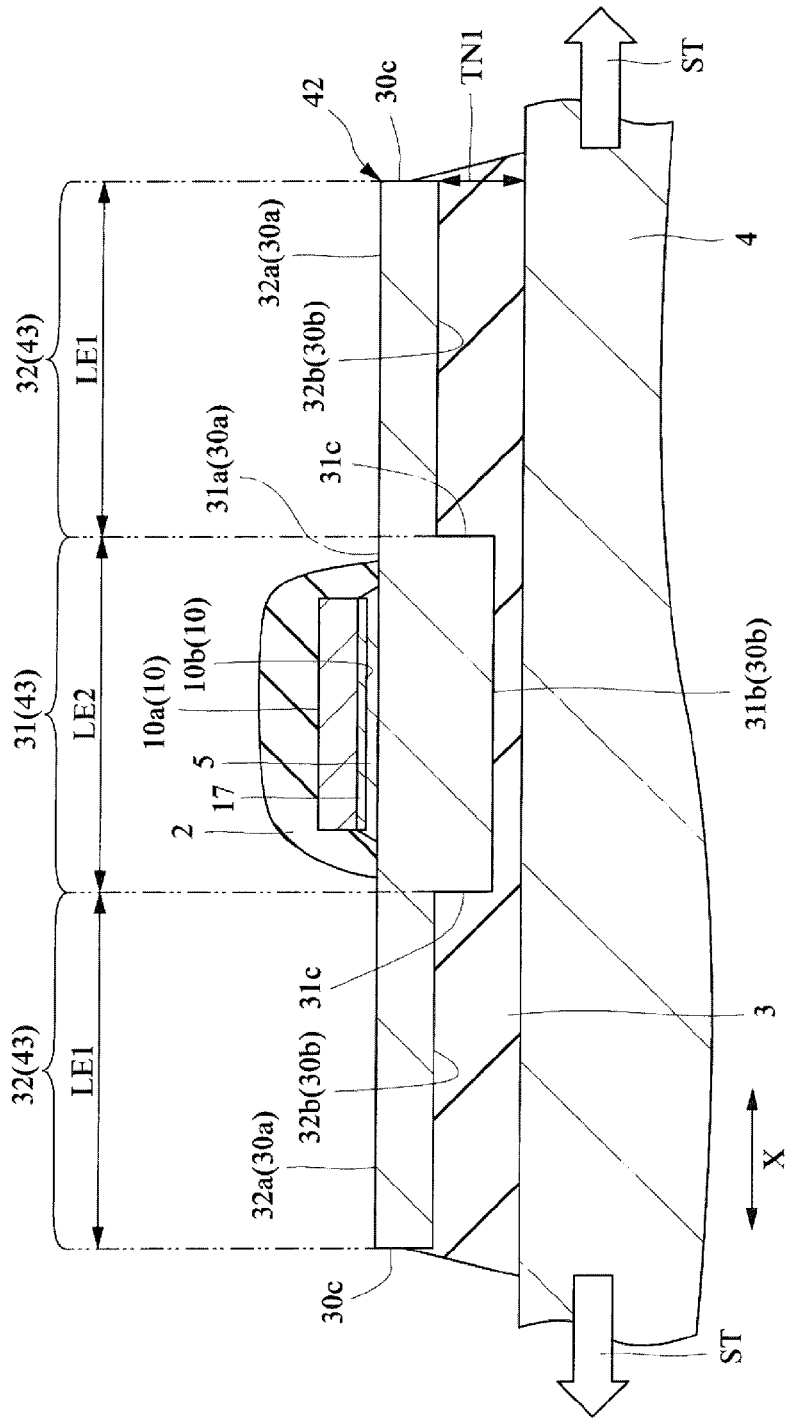
FIG. 10 is an enlarged sectional view showing a state in which a mechanical quantity measuring device as a modified example with respect to FIG. 2 is bonded and fixed onto an object to be measured.
Figure 11:
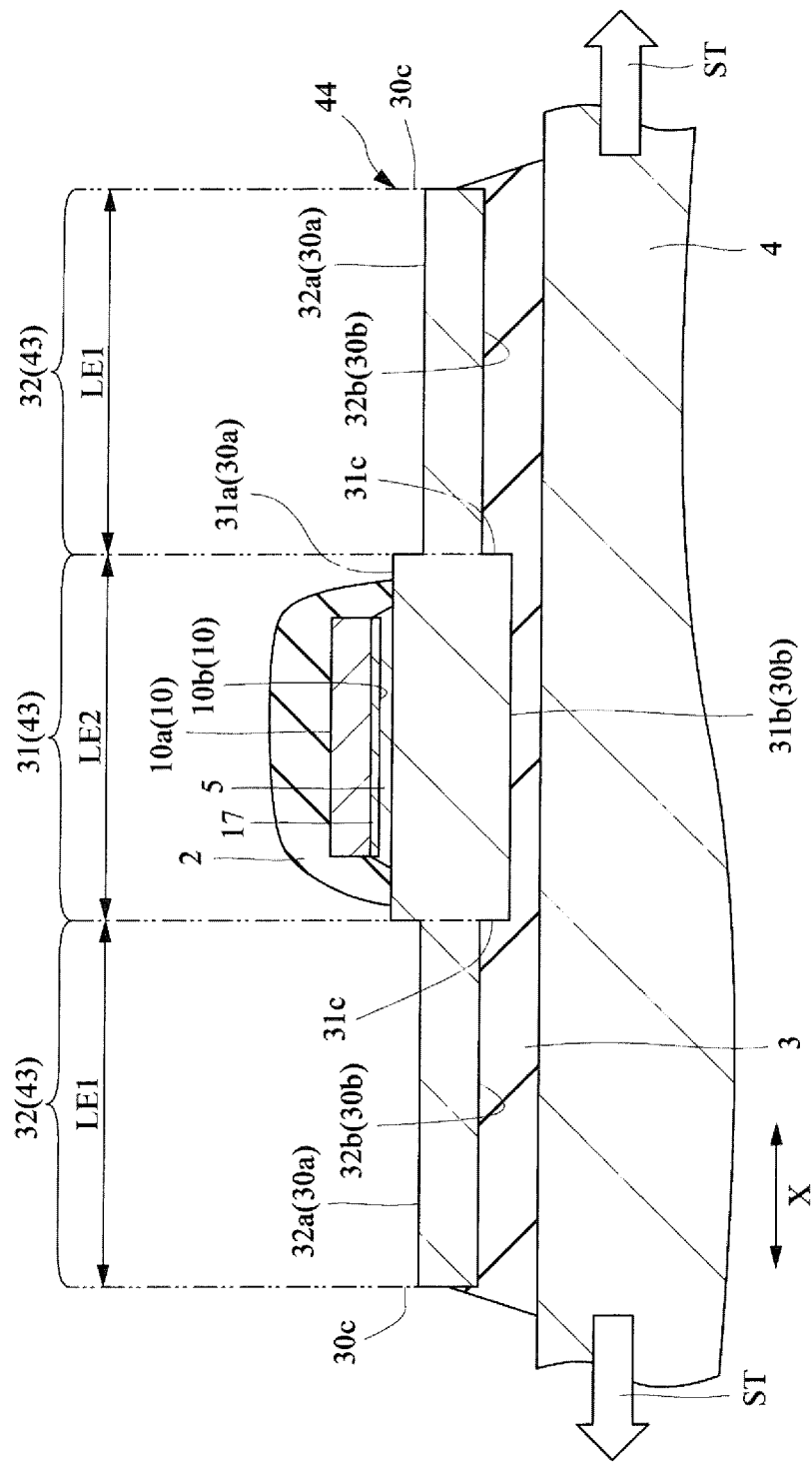
FIG. 11 is an enlarged sectional view showing a state in which a mechanical quantity measuring device as a modified example with respect to FIG. 10 is bonded and fixed onto an object to be measured.

Note that the whole lower surface 30b is not limited to the flat structure, but the region 31 may have a shape projecting toward the object to be measured 4 like a plate member 43 of a sensor module 42 shown in FIG. 10 as a modified example, for example. FIG. 10 is an enlarged sectional view showing a state in which a mechanical quantity measuring device as a modified example with respect to FIG. 2 is bonded and fixed onto an object to be measured. Further, FIG. 11 is an enlarged sectional view showing a state in which a mechanical quantity measuring device as a modified example with respect to FIG. 10 is bonded and fixed onto an object to be measured. The sensor module 42 shown in FIG. 10 is different from the sensor module 1 shown in FIG. 2 in that the region 31 of the plate member 43 projects toward the object to be measured 4 side. The other points are the same as those of the sensor module 1, and the duplicated explanation will be omitted.

The plate member 43 of the sensor module 42 shown in FIG. 10 has a structure in which the region 31 as a chip mount part projects downward (toward the object to be measured 4 side). In other words, the lower surface (mount surface) 31b of the region 31 of the plate member 43 is provided in the lower location than the lower surface (mount surface) 32b of the regions 32 in the side surface 30c of the plate member 43. Furthermore, in other words, the side surfaces 31c continuing to the lower surface 31b of the region 31 exist between the region 31 and the regions 32. That is, in the structure, the plate member 30 shown in FIG. 2 is turned upside down. Even in the structure in which the region 31 is projected downward like the plate member 43, the regions 32 having the smaller thickness than that of the region 31 are provided around the region 31 as the chip mount region, and thereby, like the sensor module 1 shown in FIG. 1, damage on the semiconductor chip 10 and occurrence of separation or crack in the bonding layer 3 may be respectively prevented or suppressed. This is because the thickness of the plate member 43 in the region 31 (the distance from the lower surface 31b to the upper surface 31a) is larger than the thickness in the regions 32 (the distance from the lower surface 32b to the upper surface 32a), and thereby, strain generated in the ends (peripheral edge) of the bonding layer 3 may be relaxed by the regions 32 having the smaller rigidity. Further, in the case of the sensor module 42 shown in FIG. 10, the lower surface (mount surface) 32b of the region 32 is provided in the higher location than the lower surface (mount surface) 31b of the region 31, and thereby, a distance TN1 between the ends (peripheral edge) of the regions 32 and the object to be measured 4 may be longer than that in the case of the sensor module 1 shown in FIG. 2. In other words, the thickness of the bonding layer 3 provided between the ends (peripheral edge) of the regions 32 and the object to be measured 4 becomes larger. The strength of the bonding layer 3 may be made stronger as the thickness is larger. Therefore, the sensor module 42 may have the thicker bonding layer 3 than that of the sensor module 1, and occurrence of crack may be suppressed.

Note that, in FIG. 10, the upper surface 30a is provided at the same height in both of the regions 31, 32 and planarized, however, the height of the upper surfaces 32a is not particularly limited. For example, as in a sensor module 44 of the modified example shown in FIG. 11, a structure in which the regions 32 are connected between the upper surfaces 31a and the lower surface 31b in the side view and the upper surfaces 32a are provided in the lower locations than the upper surface 31a may be employed. Further, FIGS. 10 and 11 have been explained as the modified examples with respect to FIG. 2, however, they may be applied in combination with the modified examples shown in FIGS. 8 and 9.

Figure 12:
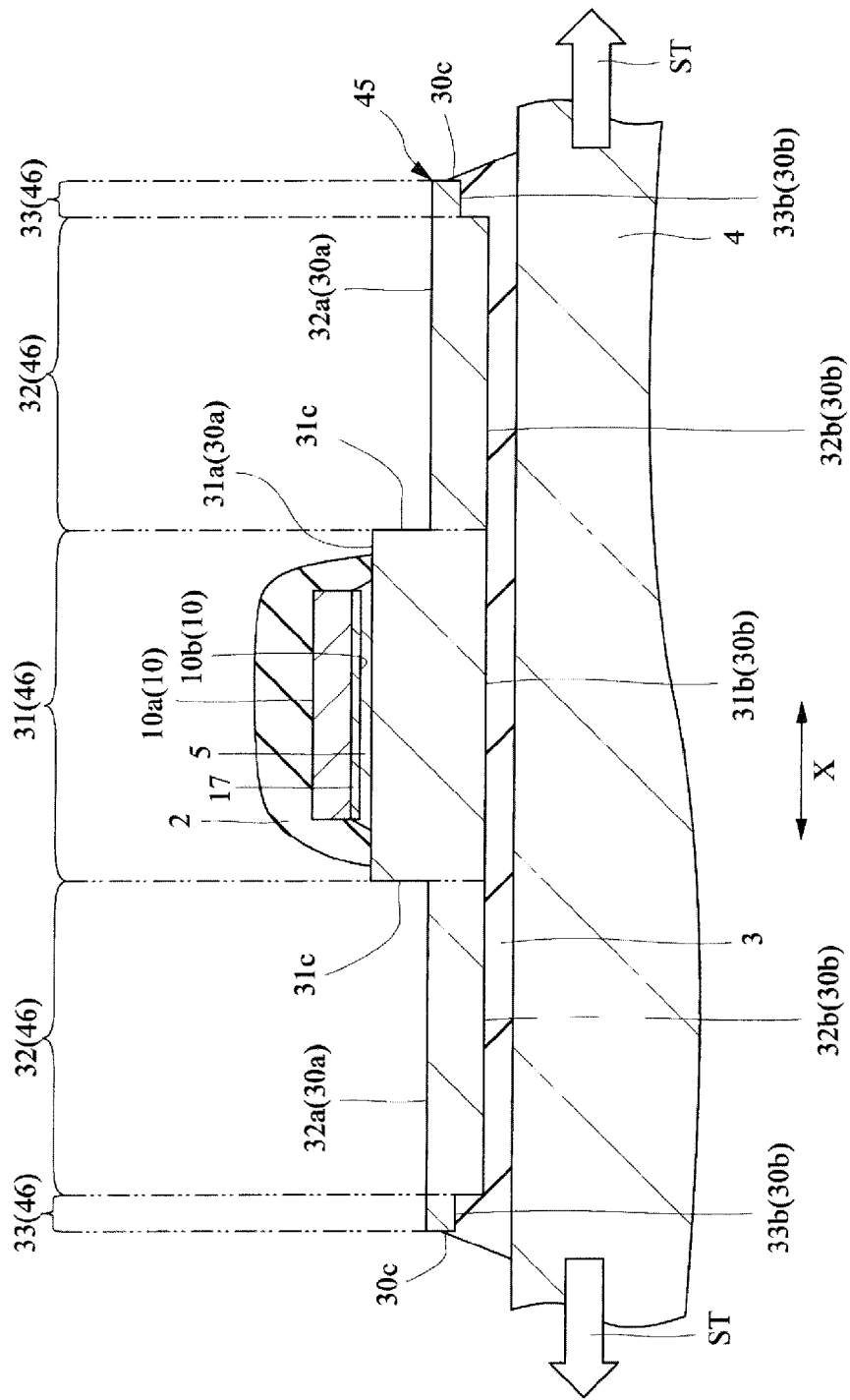
FIG. 12 is an enlarged sectional view showing a state in which a mechanical quantity measuring device as another modified example with respect to FIG. 2 is bonded and fixed onto an object to be measured.

Now, as described above, the stress generated due to shear deformation (stress causing separation or crack in the bonding layer 3) concentrates on the peripheral edge of the bonding layer 3, specifically, the bonding interface between the peripheral edge of the plate member 30 and the bonding layer 3. Therefore, in view of prevention of separation or crack in the bonding layer 3, the thickness of the bonding layer in the peripheral edge of the plate member 30 may be increased. On the other hand, in view of reduction of tilts of the upper surface of the object to be measured and the mount surface of the sensor module, it is preferable to make the area of the lower surface 31b as the mount surface as large as possible. From the points of views, for example, a configuration of a sensor module 45 shown in FIG. 12 is preferable. FIG. 12 is an enlarged sectional view showing a state in which a mechanical quantity measuring device as another modified example with respect to FIG. 2 is bonded and fixed onto an object to be measured. The sensor module 45 shown in FIG. 12 is different from the sensor module 1 shown in FIG. 1 in that a lower surface (mount surface) 33b of the peripheral edge of a plate member 46 is provided in the higher location than a lower surface (mount surface) 33b of the region 31. The other points are the same as those of the sensor module 1, and the duplicated explanation will be omitted.

The plate member 46 of the sensor module 45 shown in FIG. 12 includes regions 33 provided outside of the regions 32 and having side surfaces 30c of the plate member 46. The regions 33 have the smaller thickness than that of the regions 32. Further, the lower surfaces 33b of the regions 33 are provided in the higher locations of the lower surface 31b of the region 31 and the lower surfaces 32b of the regions 32 in the side surfaces 30c of the plate member 46. On the other hand, the lower surface 31b of the region 31 and the lower surfaces 32b of the regions 32 are provided at the same height. Further, the area of the lower surfaces 33b is smaller than the total area of the lower surfaces 31b, 32b (the area of the surfaces provided in the lowest location). Therefore, when the sensor module 45 is fixed to the object to be measured 4, the area of the lower surfaces 31b, 32b provided in the lowest location may be made larger, and fixing of the sensor module 45 at tilts with respect to the upper surface of the object to be measured 4 may be suppressed. On the other hand, the lower surfaces 33b of the regions 33 at the peripheral edge of the plate member 46 are provided in the higher locations than the lower surfaces 31b, 32b, and thereby, the thickness of the bonding layer 3 provided between the peripheral edge (outer edge) and the object to be measured 4 may be made larger than in the case of the sensor module 1 in FIG. 2. That is, variations in strain quantity (stress) transmitted from the object to be measured 4 to the plate member 46 may be suppressed and crack in the bonding layer at the peripheral edge may be suppressed. Note that FIG. 12 has been explained as the modified example with respect to FIG. 2, however, it may be applied in combination with the modified examples shown in FIGS. 8 and 9.

Figure 13:
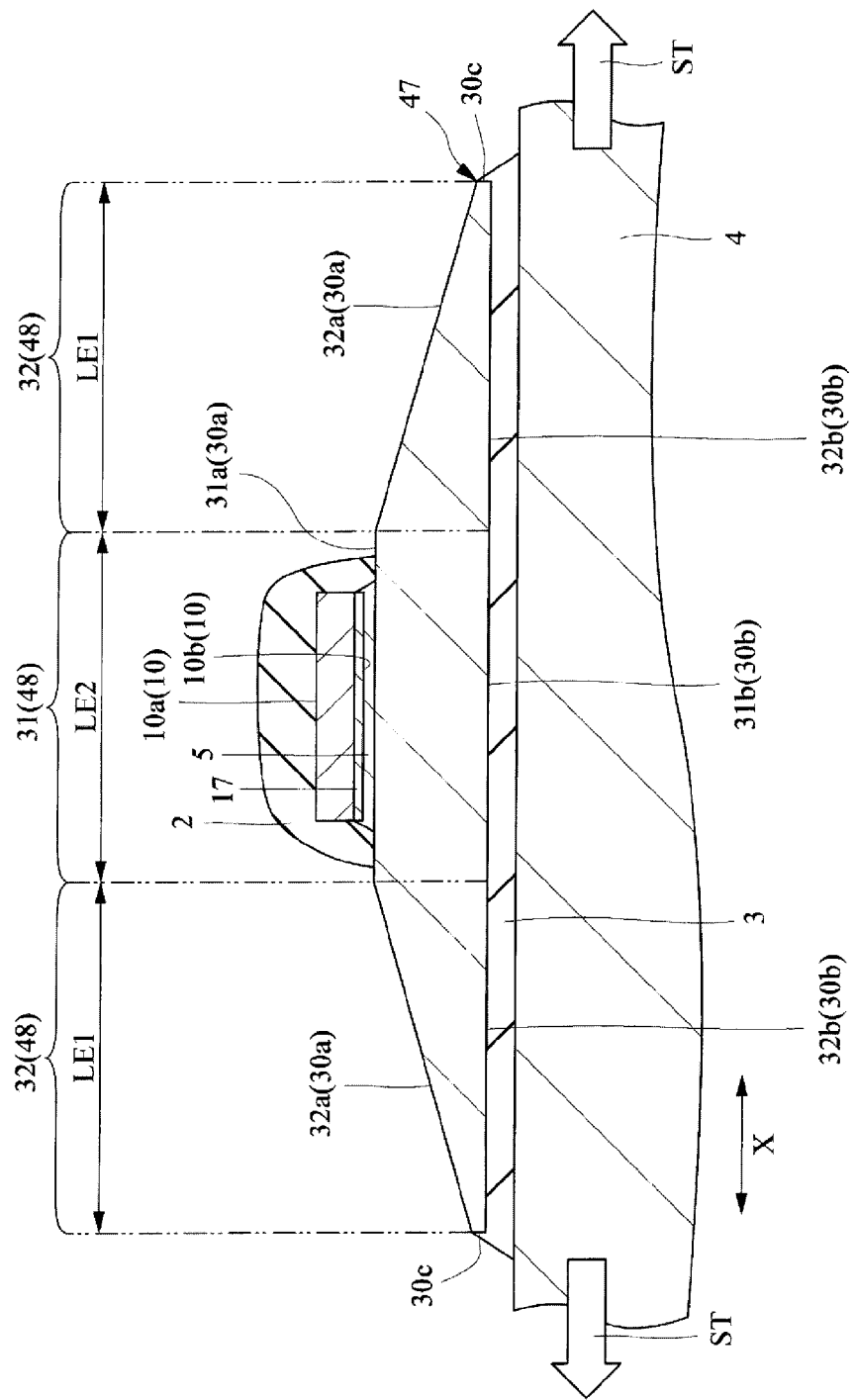
FIG. 13 is an enlarged plan view showing a state in which a mechanical quantity measuring device as another modified example with respect to the mechanical quantity measuring device shown in FIG. 2 is bonded and fixed onto an object to be measured.

Further, in FIGS. 1 to 12, stepped plate members 30, 41, 43, 46 have been explained, however, the shape of the plate member is not limited to the stepped shape. For example, it may be a trapezoidal shape like a plate member 48 of a sensor module 47 shown in FIG. 13. FIG. 13 is an enlarged sectional view showing a state in which a mechanical quantity measuring device as a modified example with respect to FIG. 2 is bonded and fixed onto an object to be measured. The sensor module 47 shown in FIG. 13 is different from the sensor module 1 shown in FIG. 1 in that the plate member 48 has a trapezoidal shape. The other points are the same as those of the sensor module 1, and the duplicated explanation will be omitted.

The plate member 48 of the sensor module 47 shown in FIG. 13 includes regions 32 having tilted upper surfaces 32*a*. The upper surfaces 32*a* are tilted surfaces, and thereby, at the peripheral edge (side surfaces 30*c*) of the plate member 48 causing separation or crack in the bonding layer 3, the thickness of the plate member 48 may be made thinner than the plate member 30 shown in FIG. 2. Accordingly, stress concentration generated immediately under the peripheral edge of the plate member 48 may be further relaxed than in the sensor module 1 shown in FIG. 2. Note that the surfaces as tilted surfaces are not limited to the upper surfaces 32*a* shown in FIG. 13, but the lower surfaces 32*b* may be tilted surfaces though not illustrated. In this regard, in view of improvement in bonding strength of the bonding layer 3, it is preferable to bond the bonding layer 3 to the side surfaces 30*c* of the plate member 48 and form a fillet. Therefore, to facilitate the formation of the fillet, it is preferable to provide side surfaces 30*c* at the tilt angle close to 90° than the upper surfaces 32*a* (or the lower surfaces 32*b*) as tilted surfaces in the peripheral edge of the plate member 48. Note that FIG. 13 has been explained as the modified example with respect to FIG. 2, however, it may be applied in combination with the modified examples shown in FIGS. 8 to 12.

Thus far, the invention achieved by the inventors has been specifically explained based on the embodiments, however, the invention is not limited to the embodiments, but, obviously, various changes may be made without departing from the scope thereof.

Figure 14:
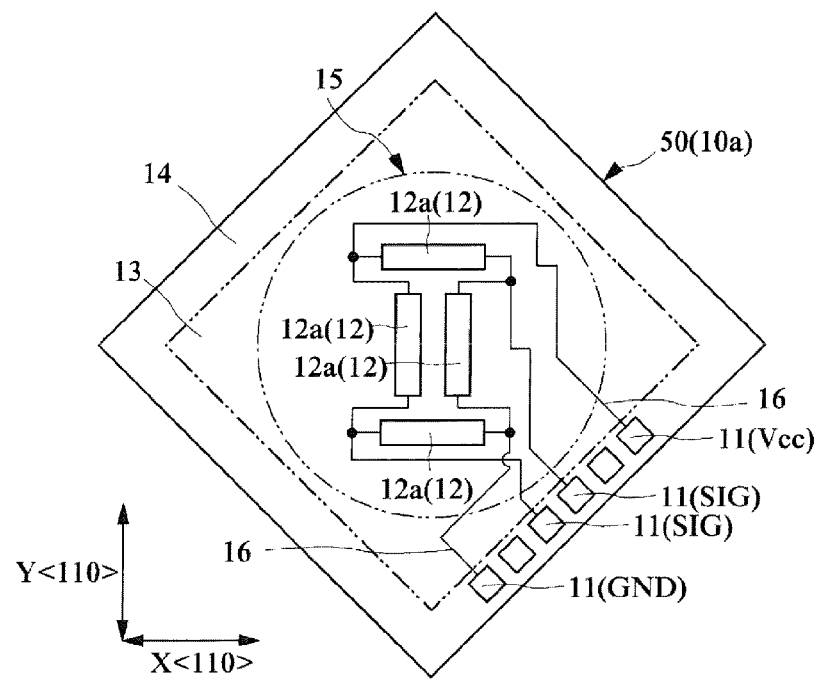
FIG. 14 is a plan view schematically showing a configuration on a front surface side of a semiconductor chip as a modified example with respect to FIG. 4.
Figure 15:
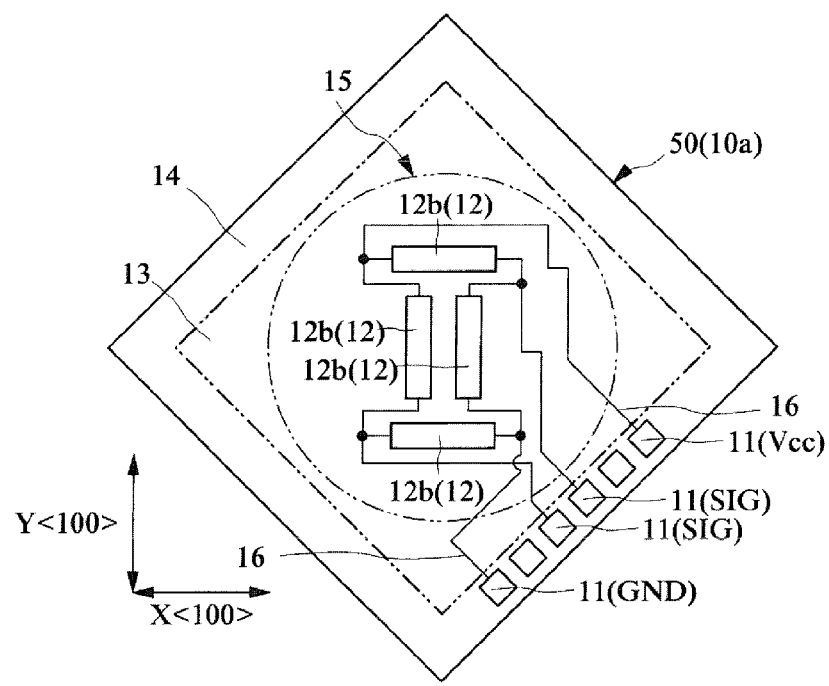
FIG. 15 is a plan view schematically showing a configuration on a front surface side of a semiconductor chip as a modified example with respect to FIG. 5.
Figure 16:
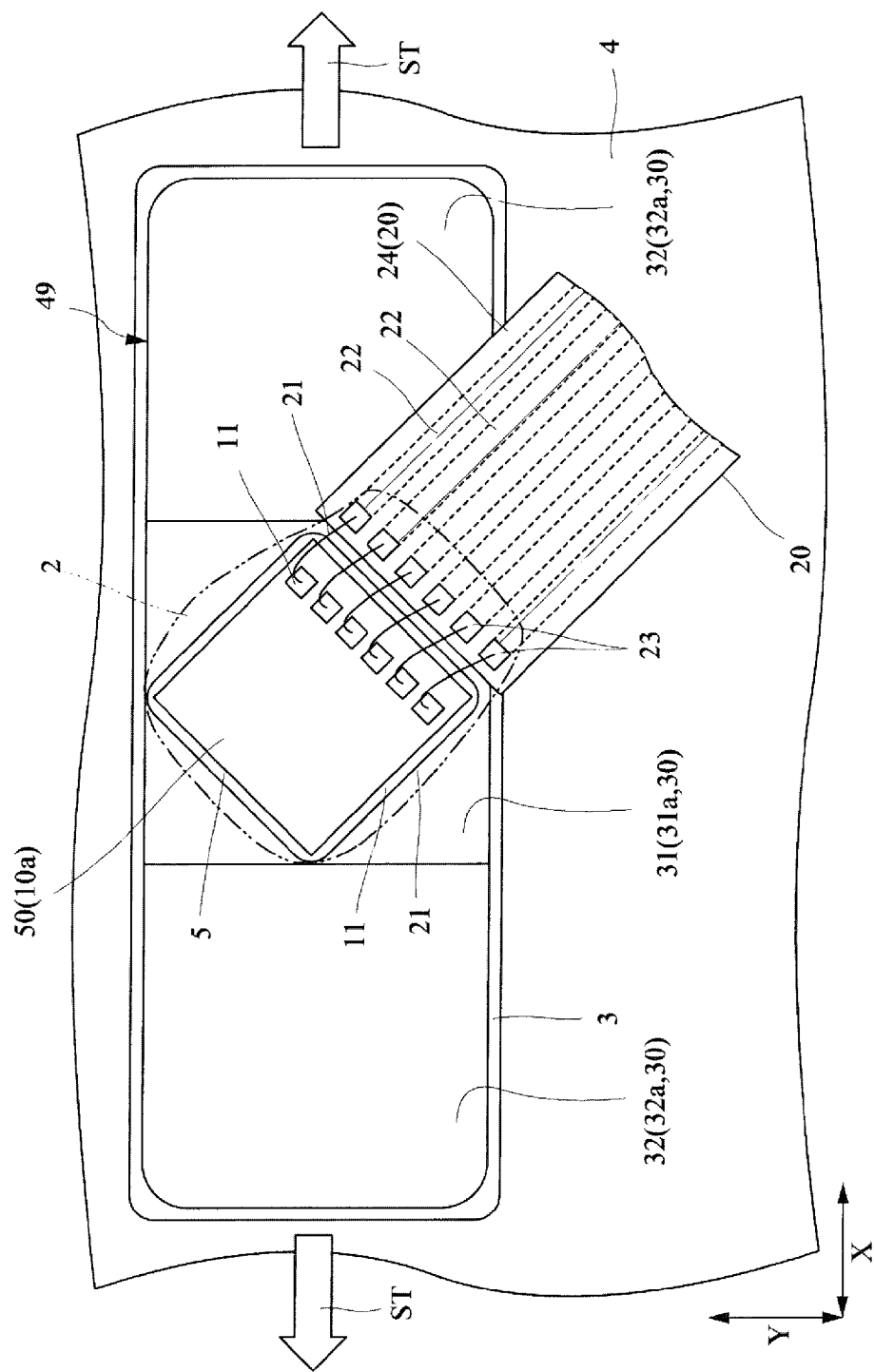
FIG. 16 is an enlarged plan view showing a mechanical quantity measuring device with a semiconductor chip shown in FIG. 14 or 15 mounted on the plate member shown in FIG. 1

For example, in the example shown in FIGS. 4 and 5, the example in which the crystal orientation in <110> directions or <100> directions of silicon single crystal are arranged along the respective sides of the front surface (principal surface) 10*a* of the semiconductor chip 10 has been shown, however, as shown in FIGS. 14 and 15, a semiconductor chip 50 in which the crystal orientation in <110> directions or <100> directions of silicon single crystal are arranged in directions tilted by 45° with respect to the respective sides of the front surface (principal surface) 10*a* of the semiconductor chip 10 may be used. In this case, like a sensor module 49 shown in FIG. 16, the semiconductor chip 50 is mounted on the center of the region 31 at tilts of 45° with respect to the respective sides of the square formed by the region 31 as the chip mount region, and thereby, tensile strain loaded on the directions shown in FIG. 16 with arrows ST may be measured. Further, the semiconductor chip 50 shown in FIGS. 14 and 15 may be applied in combination with the respective modified examples explained using FIGS. 8 to 13.

INDUSTRIAL APPLICABILITY

The invention may be widely used in a manufacturing industry for manufacturing mechanical quantity measuring devices.

The invention claimed is:

1. A mechanical quantity measuring device comprising:
   a semiconductor chip including a front surface, a plurality of piezoresistive elements formed on the front surface side, a plurality of electrodes formed on the front surface side and electrically connected to the plurality of piezoresistive elements, and a rear surface located on an opposite side to the front surface;
   a lead wire unit including a plurality of wires electrically connected to the plurality of electrodes; and
   a plate member including a chip mount surface on which the semiconductor chip is mounted and a mount surface located on an opposite side to the chip mount surface and fixed to an object to be measured, to which the semiconductor chip is fixed via a joining member so that the rear surface of the semiconductor chip may face the chip mount surface,
   wherein the plate member includes a first region facing the rear surface of the semiconductor chip and second regions provided on both sides with the first region in between, and
   a thickness of the plate member in the first region is larger than a thickness in the second region at a peripheral edge of the plate member, wherein
      the joining member has an outer peripheral region that is in direct contact with the second region of the pate member and a center region that is in direct contact with the first region of the plate member,
      a thickness of the center region is smaller than a thickness of the outer peripheral region, and
      the semiconductor chip is squared shaped, each piezoresistive element is rectangular shaped, a first pair of piezoresistive elements has longitudinal axes parallel to one another, a second pair of piezoresistive elements has longitudinal axes parallel to one another, the longitudinal axes of the first pair of piezoresistive elements are perpendicular to the longitudinal axes of the second pair of piezoresistive elements, and the longitudinal axis of each piezoresistive element makes an oblique angle to lines defined by each side of the squared shaped semiconductor chip.

2. The mechanical quantity measuring device according to claim 1, wherein the plate member is formed using a metal material.

3. The mechanical quantity measuring device according to claim 2, wherein the joining member is a solder material.

4. The mechanical quantity measuring device according to claim 3, measuring strain loaded along the mount surface of the plate member.

5. The mechanical quantity measuring device according to claim 4, wherein a total area of the second regions is larger than an area of the first region.

6. The mechanical quantity measuring device according to claim 1, wherein the first region has a square shape in a plan view, and
   the semiconductor chip is fixed to a center of the first region.

7. The mechanical quantity measuring device according to claim 1, wherein the plate member has a quadrilateral shape having two long sides opposed to each other and two short sides provided to intersect with the respective two long sides in the plan view, and
   the plate member is fixed to the object to be measured so that a direction of the two long sides may coincide with a direction of generation of strain to be measured.

8. The mechanical quantity measuring device according to claim 1, wherein the second regions are provided to continuously surround the first region and the first region is provided at a center of the second regions, and
the plate member has a square shape in the plan view.

9. The mechanical quantity measuring device according to claim 1, wherein the mount surface of the first region of the plate member is provided in a lower location than the mount surfaces of the second regions.

10. The mechanical quantity measuring device according to claim 1, wherein the plate member includes third regions provided outside of the second regions and having side surfaces of the plate member, and
the third regions have a thickness smaller than that of the second regions and mount surfaces of the third regions are provided in higher locations than the mount surfaces of the first and second regions on the side surfaces of the plate member.

11. The mechanical quantity measuring device according to claim 10, wherein an area of the mount surfaces of the third regions is smaller than a total of the mount surfaces of the first and second regions.

12. The mechanical quantity measuring device according to claim 1, wherein the plate member has a trapezoidal shape in a side view.

13. A mechanical quantity measuring device comprising:
a semiconductor chip including a front surface, a plurality of piezoresistive elements formed on the front surface side, a plurality of electrodes formed on the front surface side and electrically connected to the plurality of piezoresistive elements, and a rear surface located on an opposite side to the front surface;
a lead wire unit including a plurality of wires electrically connected to the plurality of electrodes; and
a plate member including a chip mount surface on which the semiconductor chip is mounted, a mount surface located on an opposite side to the chip mount surface and fixed to an object to be measured, and a side surface located between the chip mount surface and the mount surface, to which the semiconductor chip is fixed via a joining member so that the rear surface of the semiconductor chip may face the chip mount surface,
wherein the plate member includes a first region facing the rear surface of the semiconductor chip and a second region provided around the first region and having the side surface, and
a thickness of the plate member in the first region is larger than a thickness in the side surface of the second region, wherein
the joining member has an outer peripheral region that is in direct contact with the second region of the pate member and a center region that is in direct contact with the first region of the plate member,
a thickness of the center region is smaller than a thickness of the outer peripheral region, and
the semiconductor chip is squared shaped, each piezoresistive element is rectangular shaped, a first pair of piezoresistive elements has longitudinal axes parallel to one another, a second pair of piezoresistive elements has longitudinal axes parallel to one another, the longitudinal axes of the first pair of piezoresistive elements are perpendicular to the longitudinal axes of the second pair of piezoresistive elements, and the longitudinal axis of each piezoresistive element makes an oblique angle to lines defined by each side of the squared shaped semiconductor chip.

14. The mechanical quantity measuring device according to claim 13, wherein the plate member is formed using a metal material.

15. The mechanical quantity measuring device according to claim 14, wherein the joining member is a solder material.

16. The mechanical quantity measuring device according to claim 15, measuring strain loaded along the mount surface of the plate member.

17. The mechanical quantity measuring device according to claim 16, wherein a total area of the second region is larger than an area of the first region.

* * * * *